(12) United States Patent
Ablanczy

(10) Patent No.: US 11,049,179 B2
(45) Date of Patent: Jun. 29, 2021

(54) BILATERAL BIDDING PLATFORM FOR USE IN BULK SALE OF ITEMS IN AN ELECTRONIC MARKETPLACE

(71) Applicant: Michael Ablanczy, Castle Rock, CO (US)

(72) Inventor: Michael Ablanczy, Castle Rock, CO (US)

(*) Notice: Subject to any disclaimer, the term of this patent is extended or adjusted under 35 U.S.C. 154(b) by 0 days.

(21) Appl. No.: 17/096,158

(22) Filed: Nov. 12, 2020

(65) Prior Publication Data

US 2021/0065290 A1 Mar. 4, 2021

Related U.S. Application Data

(63) Continuation of application No. 16/762,568, filed as application No. PCT/US2019/017305 on Feb. 8, 2019, now abandoned.

(60) Provisional application No. 62/629,420, filed on Feb. 12, 2018.

(51) Int. Cl.
| | |
|---|---|
| G06Q 30/06 | (2012.01) |
| G06Q 30/08 | (2012.01) |
| G06F 16/23 | (2019.01) |
| G06Q 20/40 | (2012.01) |
| G06Q 30/02 | (2012.01) |

(52) U.S. Cl.
CPC ......... *G06Q 30/08* (2013.01); *G06F 16/2379* (2019.01); *G06Q 20/405* (2013.01); *G06Q 30/0605* (2013.01); *G06Q 30/0201* (2013.01)

(58) Field of Classification Search
CPC ............. G06Q 30/08; G06Q 30/0605; G06Q 30/0201; G06Q 20/405; G06F 16/2379

USPC ............................................... 705/26.3, 26.2
See application file for complete search history.

(56) References Cited

U.S. PATENT DOCUMENTS

| | | | |
|---|---|---|---|
| 2004/0039685 A1 | 2/2004 | Hambrecht | |
| 2004/0128224 A1 | 7/2004 | Dabney | |
| 2005/0187859 A1 | 8/2005 | Growney | |
| 2008/0015973 A1 | 1/2008 | Erisman | |
| 2008/0091624 A1* | 4/2008 | Krikler | G06Q 30/0283 |
| | | | 705/400 |

(Continued)

OTHER PUBLICATIONS

Energy Policy Group, LLC. "Competition in Bilateral Wholesale Electric Markets: How Does it Work?" In: Electric Markets Research Foundation. Feb. 2016 (Feb. 2016) Retrieved on Apr. 8, 2019 (Apr. 8, 2019) from <http://emrf.nel/uploads/3/4/4/6/34469793/bilateral_markets_white_paper_final.pdf> entire document.

*Primary Examiner* — Yogesh C Garg

(57) ABSTRACT

Utilities (e.g., systems, methods, etc.) for facilitating a bilateral bidding process between buyers and sellers of items (services, products, bundles, etc.) to allow buyers to obtain lower prices on the items through crowd bidding while simultaneously allowing sellers to essentially offset such lower prices on the items through increased sales volume of the items. Specifically, the disclosed utilities may make use of a network-based ecommerce system or platform that provides sellers of items access to real-time buyer demand and the optimum price that a plurality of buyers (e.g., customers) are willing to pay that yields increased profits. The disclosed platform also benefits buyers in cases when multiple sellers compete for the then current plurality of buyer demand resulting in a reduced price for the item based on the then real-time demand.

23 Claims, 16 Drawing Sheets

(56) References Cited

U.S. PATENT DOCUMENTS

| | | | |
|---|---|---|---|
| 2010/0262497 A1* | 10/2010 | Karlsson | G06Q 30/02 705/14.71 |
| 2016/0027110 A1* | 1/2016 | Blum | G06Q 40/04 705/37 |
| 2020/0250751 A1* | 8/2020 | Lam | G06Q 30/08 |

* cited by examiner

| NUMBER OF SELLERS IN ACTIVE BID SESSION | NUMBER OF BUYER BID(S) IN ACTIVE BID POOL | BID SESSION OUTCOME |
|---|---|---|
| 0 | 0 | NO TRANSACTIONS TAKE PLACE |
| 0 | 1 | NO TRANSACTIONS TAKE PLACE |
| 0 | >1 | NO TRANSACTIONS TAKE PLACE |
| 1 | 0 | NO TRANSACTIONS TAKE PLACE |
| 1 | 1 | SINGLE SELLER SELLS THE PRODUCT, SERVICE OR BUNDLE TO THE SINGLE BUYER |
| 1 | >1 | SINGLE SELLER SELLS THE PRODUCT, SERVICE OR BUNDLE TO ONE OR MORE BUYERS. ONLY BUYERS IN THE SELLER'S BID BLOCK RECEIVE THE PRODUCT, SERVICE OR BUNDLE |
| >1 | 0 | NO TRANSACTIONS TAKE PLACE |
| >1 | 1 | FIRST SELLER TO PLACE THE BID BLOCK FOR THE SINGLE BUYER WINS THE BID SESSION |
| >1 | >1 | THE SELLER WITH THE BID BLOCK WITH THE LOWEST SELLER BID PRICE WINS THE BID SESSION AND PROVISIONS THE PRODUCT, SERVICE OR BUNDLE TO THE BUYERS INCLUDED IN THEIR BID BLOCK |

BILATERAL BIDDING PLATFORM FOR USE IN BULK SALE OF ITEMS IN AN ELECTRONIC MARKETPLACE

CROSS REFERENCE TO RELATED APPLICATION

This application is a continuation of U.S. patent application Ser. No. 16/762,568, filed on May 8, 2020, entitled "METHOD OF CONDUCTING TWO WAY BIDDING FOR BULK SALE OF AN ITEM TO A PLURALITY OF CUSTOMERS," which is a National Stage of PCT/US2019/017305, filed on Feb. 8, 2019, entitled "METHOD OF CONDUCTING TWO WAY BIDDING FOR BULK SALE OF AN ITEM TO A PLURALITY OF CUSTOMERS," which claims the benefit of U.S. Provisional App. No. 62/629,420, entitled "METHOD OF CONDUCTING TWO WAY BIDDING FOR BULK SALE OF AN ITEM TO A PLURALITY OF CUSTOMERS," and filed on Feb. 12, 2018, the entire contents of which is incorporated herein by reference as if set forth in full.

FIELD OF THE INVENTION

This application generally relates to systems for facilitating the sale of items such as products and/or services and, more particularly, to systems for facilitating the bulk sale of items from one or more sellers to a plurality of buyers in an electronic marketplace.

BACKGROUND OF THE INVENTION

A seller with an inventory of a particular item (e.g., product and/or service) has several choices in selling the inventory. It can retail the items in a storefront, either online through an ecommerce website or through a brick and mortar location, pricing the item individually and selling the entire inventory over time. It can sell the inventory in bulk to a distributor or wholesaler typically at a price much less than it could receive in total by selling the items one by one.

SUMMARY

While the bulk wholesale approach turns over inventory more quickly to free up storage space, it does so at the expense of total revenue and profit. On the other hand, selling individually or in small multiples typically garners a higher price for each sale and potentially offers a higher return but does so at the price of higher storage costs and the risk that the inventory will be made obsolete before it is completely liquidated. The foregoing individual or bulk sales process can employ a traditional model where the seller sets the prices for a buyer to decide whether to purchase at the offered price, or the merchandise can be sold by auction, such as an online auction. Regardless, each selling process and the methods used to sell inventory of an item carries their own risks.

Sellers today are often unaware of the optimum demand to price ratio for a given product, service or bundle to realize the highest profit margin for the then current addressable market, therefore leaving potentially unaddressed sales that could otherwise yield higher profits overall. Specifically, more buyers could otherwise purchase the product, service or bundle at a lower price if the seller knew there was high enough demand at a lower price, therefore benefiting all parties from economies of scale. Existing e-commerce systems and methods typically fail to offer access to real time demand/price ratio information from a plurality of buyers for a current addressable market, thereby resulting in missed opportunity for both sellers and unaddressed buyers.

In view of at least the foregoing, disclosed herein are utilities (e.g., systems, methods, etc.) for facilitating a bilateral bidding process between buyers and sellers of items (services, products, bundles, etc.) to allow buyers to obtain lower prices on the items through crowd bidding while simultaneously allowing sellers to essentially offset such lower prices on the items through increased sales volume of the items. Specifically, the disclosed utilities may make use of a network-based ecommerce system or platform that provides sellers of items access to real-time buyer demand and the optimum price that a plurality of buyers (e.g., customers) are willing to pay that yields increased profits. The disclosed platform also benefits buyers in cases when multiple sellers compete for the then current plurality of buyer demand resulting in a reduced price for the item based on the then real-time demand.

A seller (e.g., manufacturer, solution provider, reseller, provider of e-commerce system, etc.) may initially access the disclosed platform via any appropriate device (e.g., smartphone, tablet, etc. via web access, mobile app, application programming interface (API), etc.) over one or more networks (e.g., Internet) to "subscribe" to existing items (e.g., as identified by UPC code, SKU, serial number, and/or other ID) being offered for sale on the platform (e.g., via browsing a list of available items being sold on the platform through a user interface and selecting one or more of such items in any appropriate manner). Additionally or alternatively, sellers may be able to add one or more new items they intend to offer for sale via the platform. In the case where the seller adds one or more new items they intend to offer for sale via the platform, other sellers may also subscribe to any such newly added items. As part of subscribing to items on the platform, sellers may be required to acknowledge and agree to certain requirements to provision the item(s) such as acknowledging that the seller has on-hand inventory to provision the item(s) to buyers within any particular time commitments set by the administrator of the platform, the seller is prepared to offer the item(s) as described and offered to the buyers within any particular time commitments set by the administrator of the platform, and the seller meets any required service level agreement (SLA) terms and conditions set by the administrator of the platform including but not limited to item delivery/fulfillment requirements, item exchange/return policy, buyer/customer communications, buyer/customer support, and items standards.

Buyers (customers) may access the disclosed platform via any appropriate devices (e.g., smartphones, tablets, etc. via web access, mobile app, API, etc.) over one or more networks (e.g., Internet) to browse items being offered for sale by sellers via the platform (via any appropriate user interface). Upon identifying a desired item, each buyer may be able to submit to the platform a price at or below which the buyer is willing to pay for the item (i.e., a bid). As part of this process, buyers may have access to manufacturers' suggested retail price (MSRP), previously accepted bid prices (e.g., last, three-month high/low, etc.), and/or other metrics for reference to aid in their bid decision. However, the various buyers may be unaware of the bid prices being submitted by other buyers during the current bidding session.

Each of the various submitted bids may be initially received into a staging area register of a bidding pool memory space of the platform, where the bidding pool memory space is associated with or otherwise tied to the particular item (e.g., via any appropriate key, identifier, etc.). For instance, each bid may be in the nature of bid object (e.g., data structure) that includes a price object defining the price the buyer is willing to pay for the particular item and a bid duration object defining a period of time (e.g., date/time range) that the bid object is valid in the bidding pool. As the bid objects are received into the staging register over time, a bidding engine of the platform may be configured to continuously organize the bid objects such that the bid objects are arranged in a list with the bid object having a price object with the highest price of all of the bid objects in the staging area and continuing to the bid object having a price object with the lowest price of all of the bid objects in the staging area.

At the beginning of a next of a plurality of active cyclical bidding sessions (e.g., each being 5 minutes, one hour, etc.) managed by the platform, the bid engine may automatically move the bid objects from the staging register into an active register of the bidding pool whereupon the bid objects are organized from the most expensive bid object (e.g., bid object having price object with highest price) down to the least expensive bid object (e.g., bid object having price object with lowest price). Once moved into the active register, changes to the bid objects as well as adding bid objects into the active register or removing bid objects from the active register may be prohibited during the particular active cyclical bidding session. In other words, the active register may generally be static during the duration of each respective cyclical bidding session. In one arrangement as opposed to continuously organizing the bid objects in this manner in the staging register, the bid engine may organize the bid objects in this manner in the staging register just prior to moving the same into the active register or alternatively may organize the bid objects in this manner once moved into the active register at the very beginning of the next bid session. The disclosed platform may be configured to simultaneously manage a plurality of such bidding pools for a plurality of various items.

During each particular active bidding sessions for an item for which sellers are respectively subscribed, each seller may select a particular one of the bid objects in the active register where the price of the particular selected bid object represents the lowest price at which the seller may need to sell the item (to the buyer associated with the particular selected bid object and each of the buyers associated with bid objects above the selected bid object) if the seller wins the particular active bidding session as discussed in more detail below. Each collection of bid objects that includes the particular selected bid object and bid objects above the selected bid object (i.e., bid objects more expensive than selected bid object) is referred to herein as a "bid block" that is associated with or otherwise tied to a particular seller during a particular active bidding session.

Generally, each seller may have particular criteria in order to take action or in other words select a particular bid object (and thus create a particular bid block) during a respective active bidding session for an item. For instance, each particular seller may have a particular optimum demand/price ratio that they are seeking to meet as part of the active bidding session and may determine when such optimum demand/price ratio is satisfied by reviewing each of the bid object prices as well as the number of bid objects above the particular bid object in the active register. Each seller may select a particular bid object manually on any appropriate device or via an API that embodies (e.g., via rules) the seller's particular preferences, optimum demand/price ratios, timing, etc. (whereupon selection of a particular bid object generates a signal or message for transmission over one or more networks for receipt at the bid engine of the platform).

During the active bidding process where multiple sellers are supported, each seller may be unaware if other sellers are bidding and, even if so, unaware as to the bid blocks being created by the other sellers. Generally, only a single seller may select a particular bid object during the active bidding session. Thus, if two or more sellers submit selections for the same bid object, the seller selection having the earliest time stamp (e.g., according to the time received at the bid engine, according to a time the selection was initially generated by the seller device, etc.) may be initially associated with the particular bid object for the particular bidding session until one or more particular sellers have "won" the bidding session as discussed below. If two or more sellers choose the bid object at the exact same time (e.g., based on time stamps recorded by the platform, such as upon receipt of each of the seller selections), the platform may randomly select one seller to claim the corresponding bid block and notify the competing seller(s) to choose a new particular bid block in the active register (e.g., a new "bottom price" for the particular item).

In one arrangement, the bidding engine may, automatically upon receiving a seller indication of a particular bid object, access any appropriate database identifying a current number of the item the respective seller has in stock for shipment to buyers and confirm that the current number is equal to or greater than the total number of bid objects (and thus buyers) in the respective bid block of the seller. The bidding engine may automatically reject the seller indication if the total in stock is less than the number of bid objects in the desired bid block and generate a corresponding message to the seller (e.g., that the total in stock is too low and that another bid object may be selected).

In one embodiment, each seller selection may be "locked in" (cannot be changed, removed, etc.) once selected for the duration of the particular active bidding session. In another embodiment alternatively, a seller's API may have access to any appropriate preferences of the seller and implement rules to automatically adjust the seller's bid during the bidding session. As an example, one preference might be to automatically ensure that the seller's bid object selection is always the bid object with the lowest price of all other selected bid objects (e.g., but not lower than a particular floor price). For instance, in the case where a second seller selects a bid object having a price lower than the bid object of the first seller, the first seller's API may automatically reduce the first seller's bid selection to the immediately lower (in price) bid object from that of the second seller.

At a conclusion of the particular active bidding session, the bidding engine may automatically identify the lowest (cheapest) selected bid object (or in other words the bid block with the most bid objects) and then generate an indication regarding the same. For instance, the generated indication may be in the form of any appropriate data structure identifying the particular seller (e.g., a seller ID) associated with the identified bid object, the price of the bid object, all other bid objects above the selected bid objects and their corresponding prices and seller IDs, item ID, and/or the like. The seller may then be obligated (e.g., according to rules of the ecommerce provider as agreed to by each seller upon registration with the platform) to sell the item to the buyers associated with all bid objects in the selected bid block at the price of the lowest selected bid object. Alternatively, the seller may be obligated to sell the item to each buyer in the selected bid block at the specific respective price of bid object associated with the buyer in the bid block. If only one seller establishes a bid block during the particular active bidding session, that seller may be obligated to sell and provision the item to the buyers in the seller's respective bid block. In cases where there are no sellers bid blocks submitted in a bid session, no bid transactions may take place.

If the winning seller's in stock total was not previously confirmed by the platform, the bidding engine may then do the same and only allow the winning seller to proceed in the case of a positive answer. In the event of a negative answer, the bidding engine may automatically award the winning bid block to the next higher bid block of all of the bid blocks created by the sellers (e.g., assuming the bidding engine confirms the in stock total with such seller).

The final winning bid price at which the winning seller is to sell the items to all of the buyers associated with the bid objects in the winning bid block may include costs associated with the purchasing the product such as bidding system fees (e.g., payable to the ecommerce provider managing the platform), taxes, any shipping fees, etc. In other words, each buyer may submit their bid into the system with the understanding that such bid is inclusive of such fees. In other embodiments, the sell price bid may not include shipping fees or sales taxes and would be added onto the winning price as these particular fees may vary from potential buyer to buyer depending on the buyer's location. In yet other embodiments, the winning seller may be obligated to sell the product to all winning buyers who bid higher than seller's sell price bid but at the amount bid by each buyer (i.e. the buyers would purchase the product for the price they offer if their offer is greater than the sell price bid).

In embodiments, the platform can facilitate transactions by automatically billing winning buyers, deducting any service fees for using the bidding system and transferring the monetary proceeds along with names and addresses of the winning buyers to the winning seller. In some instances, prepaid shipping labels can be provided to the seller where the shipping cost is deducted from the proceeds prior to transferring it to the seller. In other variations, the platform may only provide the seller with the names and addresses of the buyers leaving it up to the seller to charge the buyer and arrange for shipment of the product. The seller's account on the platform might be charged the fees in exchange for participation in the bid session and/or a commission for each sale associated with the bid session. As can be appreciated, the financial arrangement between the bidding system and the seller can vary significantly between embodiments.

In one arrangement, two or more sellers could agree to combine their inventory and be represented as a single seller on the disclosed platform. As may be appreciated, doing so may allow smaller sellers to compete with larger sellers who may otherwise have higher inventory levels and therefore have an advantage to choose a larger bid block (e.g., lower price) and therefore allow for more equitable opportunity to complete which benefits smaller sellers and buyers alike. For instance, each group of sellers could agree to act as a single "group" seller and agree to terms and conditions and service levels to be represented as such a "group" seller entity. Features and business rules (e.g., including group seller engagement rules) set by the provider can enable this relationship status and capability. In one arrangement, a seller may use the disclosed platform to create a group seller entity that others could join or join an existing group. The creator of each respective group seller entity may set the criteria to join (e.g., minimum inventory, bid price range or limits the seller must accept, etc.) and may have authority to accept or reject sellers from joining their group.

Thereafter, the bidding engine may automatically prepare the active register for a subsequent cyclical bidding session (e.g., where an end of the current bidding session is adjacent and non-overlapping with the subsequent bidding session). Part of this process may include the bidding engine removing any of the bid objects from the active register that were included in the winning bid block from the immediately previous bidding session such that the remaining bid objects include those that were not included in the winning bid block. In one arrangement, each bid object may include a bid duration object that sets forth a particular duration (e.g., length or time, particular time, etc.) for which the bid object is to be valid or active in the bid pool. Buyers, during the initial creation of a bid for a particular item, may be prompted to set such duration by the platform through a user interface on the buyer's respective device. The platform may then create the respective bid object based on the input provided by the buyer such as the price object, the duration object, and other objects (e.g., that identify the particular item, the particular buyer, etc.). In any event, the bidding engine may be configured to review the bid duration object of each of the remaining bid objects and confirm that the duration or time specified in the duration object does not expire before the beginning of the subsequent bidding session. The bidding engine may automatically remove any bid objects having expired durations from the remaining bid objects.

Another part of the preparing the active register for the subsequent bidding session is moving all bid objects that have built up in the staging register during the prior bidding session into the active register. As discussed above, the active register is static during each particular active bidding session such that buyer bid objects received at the bidding pool are introduced into the staging register rather than into the active register. Before introduction into the active register, the bidding engine may for instance review the bid duration object of each of bid objects in the staging area and confirm that the duration or time specified in the duration object has not expired. The bidding engine may automatically remove any bid objects having expired durations from the staging area. At or just before the beginning of the subsequent bidding session, the bidding engine may move the unexpired bid objects from the staging register and add them to any remaining bid objects in the active register. Part of this process may include the bidding engine organizing the bid objects so as to be arranged in the active register from the most expensive to least expensive. If two or more bid objects have the same price, the bidding engine may automatically arrange such bid objects based on their respective time stamps (e.g., time stamps indicating when buyers created respective bids or when bids were received at platform). In any case, sellers may be able to select different respective ones of the bid objects in the active register during the subsequent (now current) bidding session and the bidding engine may select a winner as discussed previously. Each subsequent cyclical bidding session may proceed in this manner such as until no further bid objects remain in the active register or the like.

In one arrangement, the platform may maintain a plurality of pairs of active registers and staging registers for each particular bidding session in the bidding pool for the particular items. For instance, and rather than making use of the same active register for a subsequent bidding session, the bidding engine may be configured to move (or copy) the remaining bid objects from the first active register into the second or subsequent active register in the bidding pool (e.g., except as to those that have expired). Also, any bid objects created by the platform during the current bidding session would be received into the second or subsequent staging register associated with the second or subsequent bidding session for movement into the second or subsequent active register at or just before the start of the second or subsequent bidding session (e.g., after removing any expired bid objects).

In addition to price and duration objects, the platform may also create numerous other objects based on receipt of input from buyers. As one example, another object in each bid object may be a user ID that uniquely identifies the corresponding buyer on the platform as to other buyers. As another example, each bid object may include a "preferences" object that includes specific buyer preferences. For instance, a buyer may be simultaneously bidding on two different televisions (e.g., during two parallel bidding sessions on the platform) but may not want to purchase both televisions in the event the buyer's bids were both in the winning bid blocks.

In one arrangement, a buyer may be able to configure (e.g., via buyer device) the preferences objects of the two respective bids such that one of the bids is the "primary" bid (e.g., by way of configuring a higher priority number) and the other bid is the "secondary" bid (e.g., by way of configuring a lower priority number). In this regard, the platform may be configured to only allow the conditional bid to be included in a winning bid block if the platform determines that the primary bid was not included in a winning bid block in its parallel bidding session. Sellers may be required to accept, as part of the rules of engagement, the risk that winning bid blocks may be reduced in number by virtue of any conditional bids associated with primary bids that were included in respective winning bid blocks.

In another arrangement, conditional bids may not be allowed on the platform (i.e., only one item in the conditional bid may participate in a bid session at any given time) such that the possibility of parallel bid sessions is avoided. This arrangement may be managed through business rules/algorithms/artificial intelligence capabilities utilized by the platform to automatically choose which item has best chance of being accepted for next scheduled (and otherwise possibly overlapping) bid session. For instance, the bid engine may leverage multiple inputs, including bid information provided by the buyer, data collected by active and historical seller(s), data collected by other active and historical buyer(s), data collected by active and historical size of bid pools, other like products/services, and other active and historical transactional and environmental data. The result of this activity ends with the bid engine choosing which conditional product/service is accepted to move to the next active register. The other product/service in the conditional bid will remain in the staging register until the active product/service bid session expires. The process may repeat if the particular buyer's bid is not accepted in the bid session. In the case where bid sessions across products/services in the conditional bid do not have the same start and end time, the bid engine may account for this and stage items until a new chosen item bid session begins.

The disclosed platform provides sellers of items access to real-time buyer demand and the optimum price that a plurality of buyers (e.g., customers) are willing to pay that yields increased profits. The disclosed platform also benefits buyers in cases when multiple sellers compete for the then current plurality of buyer demand resulting in the lowest possible price for the item based on the then real-time demand.

In one aspect disclosed herein, a method for facilitating the bulk sale of a product and/or service from a seller to a plurality of buyers in an electronic marketplace includes receiving, into a staging register of a bidding pool of a computerized bidding system, a plurality of bid objects for a particular product and/or service from a respective plurality of potential buyers, wherein each bid object includes a price object defining a price at or below which the respective buyer is willing to pay for the particular product and/or service; organizing, by a bidding engine of the computerized bidding system, the bid objects in the staging register starting with the bid object having a price object with a highest price and continuing to the bid object having a price object with the lowest price, wherein the bid objects in the staging register after being organized comprise organized bid objects; moving, by the bidding engine at the beginning of a bid session, the organized bid objects into an active register of the bidding pool; receiving, by the bidding engine during the bid session, an indication of a particular one of the bid objects in the active register from a potential seller of the particular product and/or service, wherein the particular one of the bid objects and the bid objects above the particular bid object up to the bid object having the price object with the highest price comprises a bid block; and generating, by the bidding engine at a conclusion of the bid session, an indication of the bid block.

A further understanding of the nature and advantages of the present invention may be realized by reference to the remaining portions of the specification and the drawings, wherein like reference labels are used through the several drawings to refer to similar components. In some instances, reference labels are followed with a hyphenated sublabel; reference to only the primary portion of the label is intended to refer collectively to all reference labels that have the same primary label but different sublabels.

BRIEF DESCRIPTION OF THE DRAWINGS

FIG. 10 is a table illustrating a plurality of bid session use cases on the disclosed platform.

FIG. 14 is a screenshot of the user interface of FIG. 13 after a buyer has selected one of the items.

FIG. 16 is screenshot of a user interface through which a seller may review items for which the seller has subscribed on the disclosed platform.

DETAILED DESCRIPTION

Disclosed herein are utilities (e.g., systems, methods, etc.) for facilitating a bilateral bidding process between buyers and sellers of items (services, products, bundles, etc.) to allow buyers to obtain lower prices on the items through crowd bidding while simultaneously allowing sellers to essentially offset such lower prices on the items through increased sales volume of the items. Specifically, the disclosed utilities make use of a network-based ecommerce system or platform (computerized system or platform) that provides sellers of items access to real-time buyer demand and the optimum price that a plurality of buyers (e.g., customers) are willing to pay that yields increased profits. The disclosed platform also benefits buyers in cases when multiple sellers compete for the then current buyer demand resulting in a reduced price for the item based on the then real-time demand.

Figure 1:
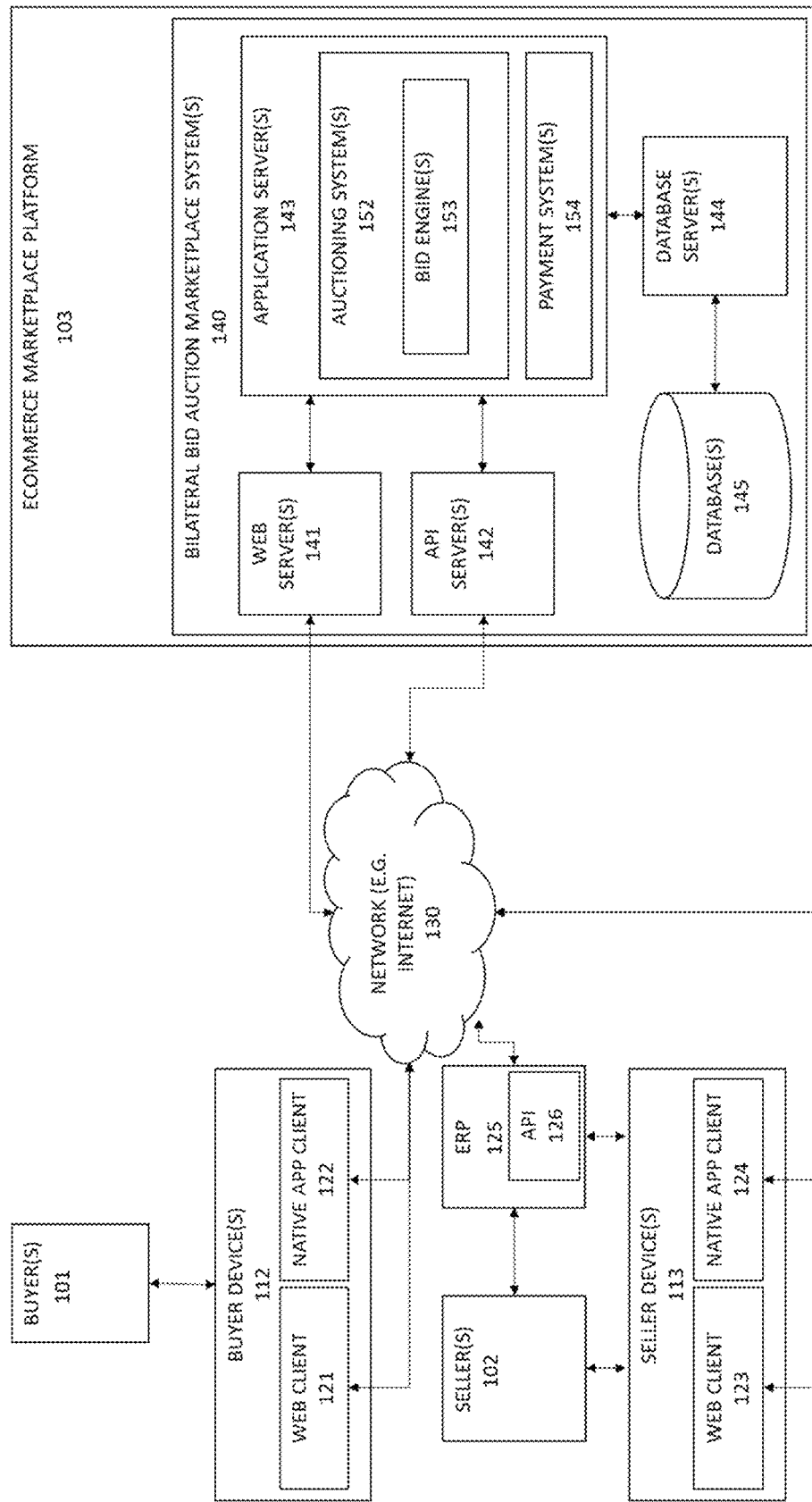
FIG. 1 is a system diagram of an ecommerce marketplace platform that facilitates bilateral bidding of bulk items between sellers and buyers.

Initial reference is made to FIG. 1 which presents a system diagram illustrating how each of one or more buyers 101 and one or more sellers 102 may interact (e.g., over one or more networks 130 such as the Internet) with an ecommerce marketplace platform 140 (also known as a bilateral bid auction marketplace platform) that is owned or managed by an ecommerce marketplace provider 103 to facilitate bilateral bidding of bulk items between the seller(s) 102 and buyer(s) 101. While shown separately, the one or more sellers 102 may in some arrangements be the provider 103 or license use of the platform 140 for use with their own web site. For instance, a large retailer that currently does not offer others to sell on their network can leverage the utilities disclosed herein to capitalize on bulk sales through the disclosed crowd-based bidding process.

The platform 140 may include any appropriate combination of servers, databases, and/or other systems (e.g., disposed at one location or interconnected at a plurality of locations) that are configured to substantially seamlessly implement a bilateral bidding process between sellers and buyers for bulk items. Broadly, the platform 140 may include one or more application servers 143 for interfacing with one or more servers, systems and/or databases necessary to manage the bilateral bidding processing disclosed herein. As an example, the application servers 143 may include at least one auctioning system 152 that is configured to manage items subscribed to and/or added to the platform by sellers as well as bids for items received by the platform 140. For instance, the auctioning system 152 may include a bidding engine 153 (e.g., one or more sets of computer readable instructions executable by one or more processors of the auctioning system 152) that is configured to implement a plurality of rules, algorithms, processes and/or tools to execute the bilateral bidding processes disclosed herein.

The application servers 143 may also include (or be networked to and make use of) one or more payment systems 154 dedicated to payments and other financial processes and functions between the sellers 102, buyers 101, and ecommerce marketplace provider 103. The one or more application servers 143 (e.g., the auctioning system 152, payment system(s) 154) may communicate with one or more databases 145 via one or more database servers 144 as part of the bilateral bidding process. The database(s) 145 include any appropriate collection of structured data to enable the bilateral bidding process and may include or represent data provided by actors (sellers 102, buyers 101, ecommerce marketplace provider 103, third party entities, and other actors, etc.) and information systematically generated by the platform 140 and/or received from other systems, networks and devices used for the bilateral bidding process.

The platform 140 may communicate with buyers 101 and sellers 102 in any appropriate manner. For instance, the platform 140 may include at least one web server 141 (e.g., server software and associated hardware that processes incoming network requests over HTTP and/or other related protocols over the network(s) 130) and/or at least one API server 142 (e.g., servers dedicated for API functions and processes and enables third party applications used by seller device 113 and/or buyer devices 112 to interface with the platform 140). In relation to each buyer 101, the buyer 101 may utilize any appropriate buyer device 112 (e.g., smartphone, tablet, server, etc.) to access a web client 121 (e.g., browser) or a native app client 122 (e.g., app) to communicate with the at least one web server 141 over network 130. In relation to each seller 102, the seller 102 may utilize any appropriate seller device 113 (e.g., smartphone, tablet, server, etc.) to access a web client 123 (e.g., browser) or a native app client 124 (e.g., app) to communicate with the at least one web server 141 over network 130. In one arrangement, the seller device 113 may access any appropriate API 126 (e.g., developed by the ecommerce marketplace provider 103 or licensee of the provider 103 and includes a set of routines, protocols, and tools for building software applications) of an enterprise resource planning (ERP) system to integrate business functions (e.g., such as planning, purchasing, inventory, sales, marketing, finance and human resources) into the bilateral bidding process disclosed herein.

Figure 2:
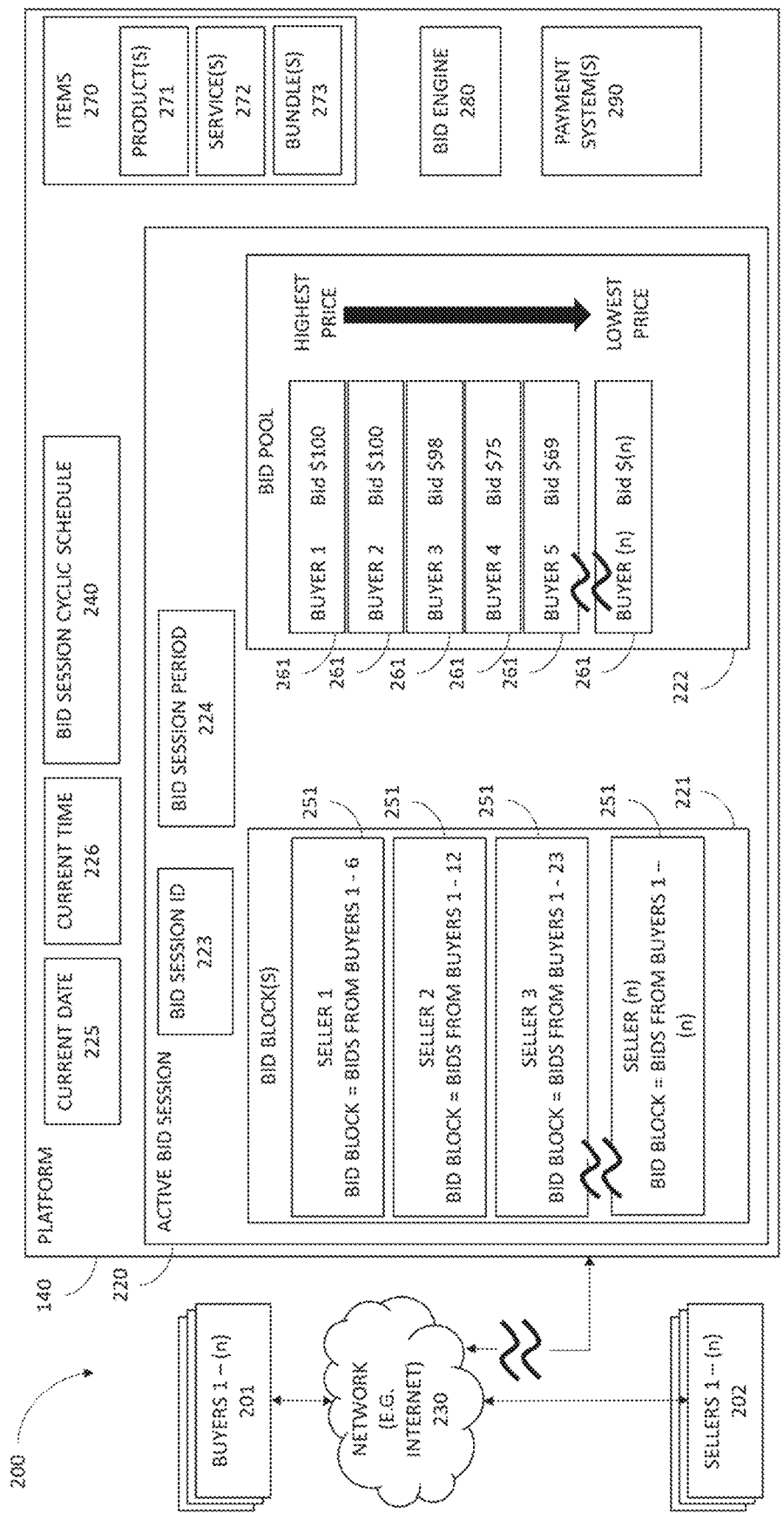
FIG. 2 is a schematic diagram illustrating a bidding session between sellers and buyers on the disclosed platform.

Turning now to FIG. 2, a schematic diagram is presented that broadly illustrates a bidding session between sellers 202 (e.g., sellers 102) and buyers (e.g., buyers 101) on the disclosed platform 140 via one or more networks 230 (e.g., networks 130) for items. As used herein, an "item" 270 may be a product 271, service 272, or bundle 273. A product 271 is a commercially distributed good that is tangible personal property with output or result of a fabrication, manufacturing, or production process, and passes through a distribution channel before being consumed or used and is available for purchase on the platform 140. A service 272 is work performed by the seller (or third-party actor(s) represented by the seller) that is uniquely identifiable and repeatable and is performed by an individual, team, organization or technology system for the benefit of the buyer (and is available for purchase on the platform 140). A bundle 273 is two or more products 271, two or more services 272, or one or more products 271 and one or more services 272.

The platform 140 may maintain a listing (e.g., as part of a relational database management system (RDBMS) or the like) of various items 270 (e.g., in database 145 of FIG. 1) for sale from sellers 202 to buyers 201, where each item 270 may be uniquely identified by any appropriate identifier (e.g., ID, part number, code, etc.) relative to other items 270 of the platform 140. In some situations, the platform 140 may create its own unique identifier for the items while in other situations the platform 140 may use a manufacturer part number or the like. In connection with each item identifier, the platform 140 may maintain (or at least have access to) numerous associated data and analytics for corresponding item for use by the platform 140, sellers in connection with selecting items to sell and engaging in the disclosed bilateral bidding process, buyers in connection with selecting items on which to bid in the disclosed bilateral bidding process, and the like. For instance, some of the data that may be maintained by the platform 140 with each of the items is MSRP, 30 (or other) day high price, 30 (or other) day low price, ratings, reviews, item images and/or videos, and the like.

Figure 9:
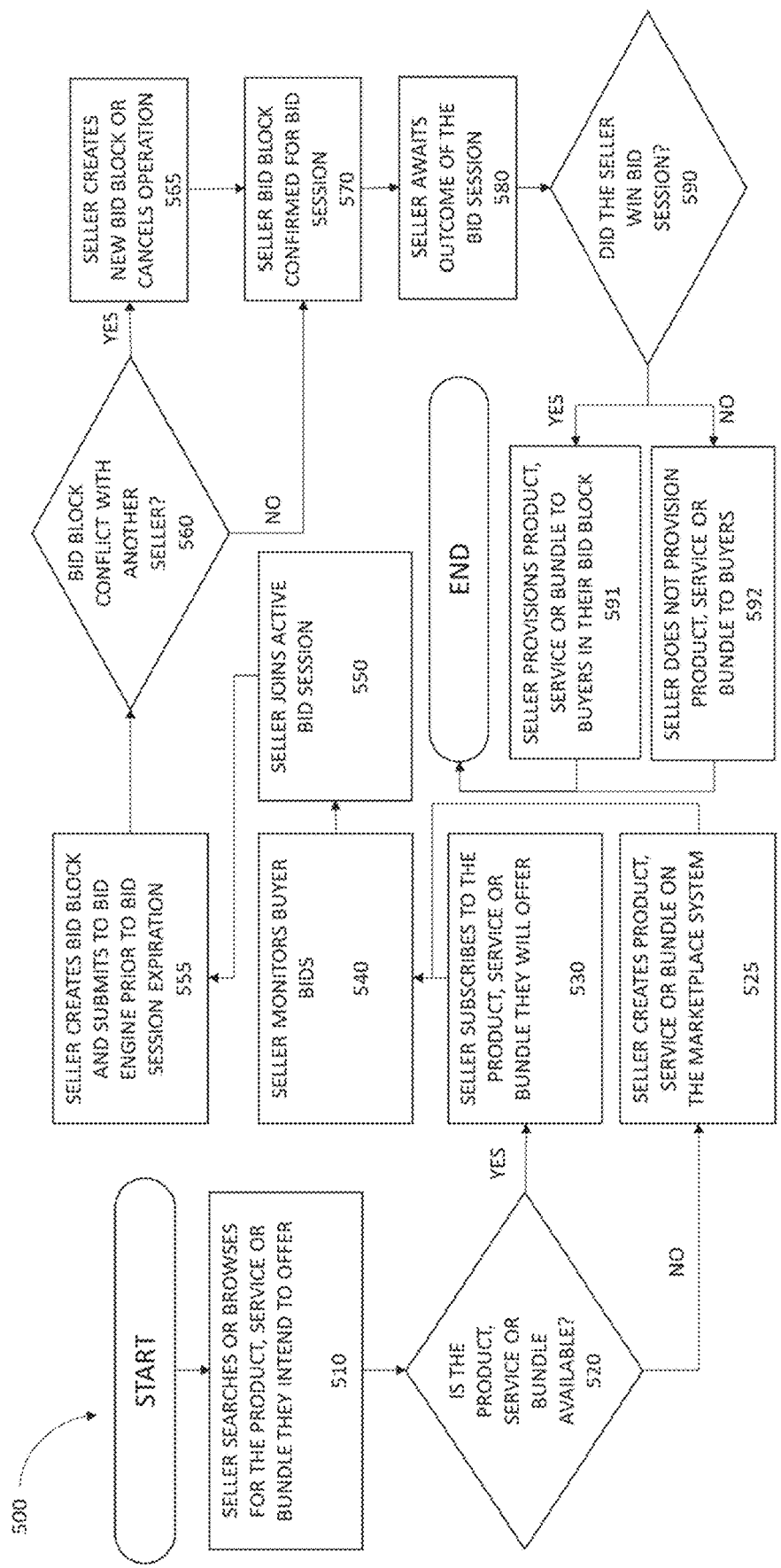
FIG. 9 is a flow diagram of a method that may be engaged in by a seller of bulk items on the disclosed platform.

With additional reference now to the method 500 of FIG. 9, a seller 202 (e.g., manufacturer, solution provider, reseller, provider of ecommerce system, etc.) may (e.g., either manually or via API) initially access the platform 140 via seller device 113 over network 230 and search 510 or browse for an item 270 that they intend to offer on the platform 140. Before searching or browsing 510, sellers may be required to register with the platform 140 by way of providing any appropriate information (e.g., name, mailing address, email address, contact name, bank account information, etc.) to create an account. The seller 202 may then query 520 whether the item is already available on the platform 140 and then "subscribe" 530 to the item 270 if it is already available or create 525 the item if not available. Part of creating 525 the item may include providing the platform 140 with information and data such as name, part number, manufacturer, and/or the like. In other arrangements, the platform 140 may, upon receiving one or more pieces of information (e.g., part number), actively acquire additional information regarding the item (e.g., manufacturer, name, type) in any appropriate automated manner. After creating 525 the items, the seller may then subscribe 530 to the item.

Figure 16:
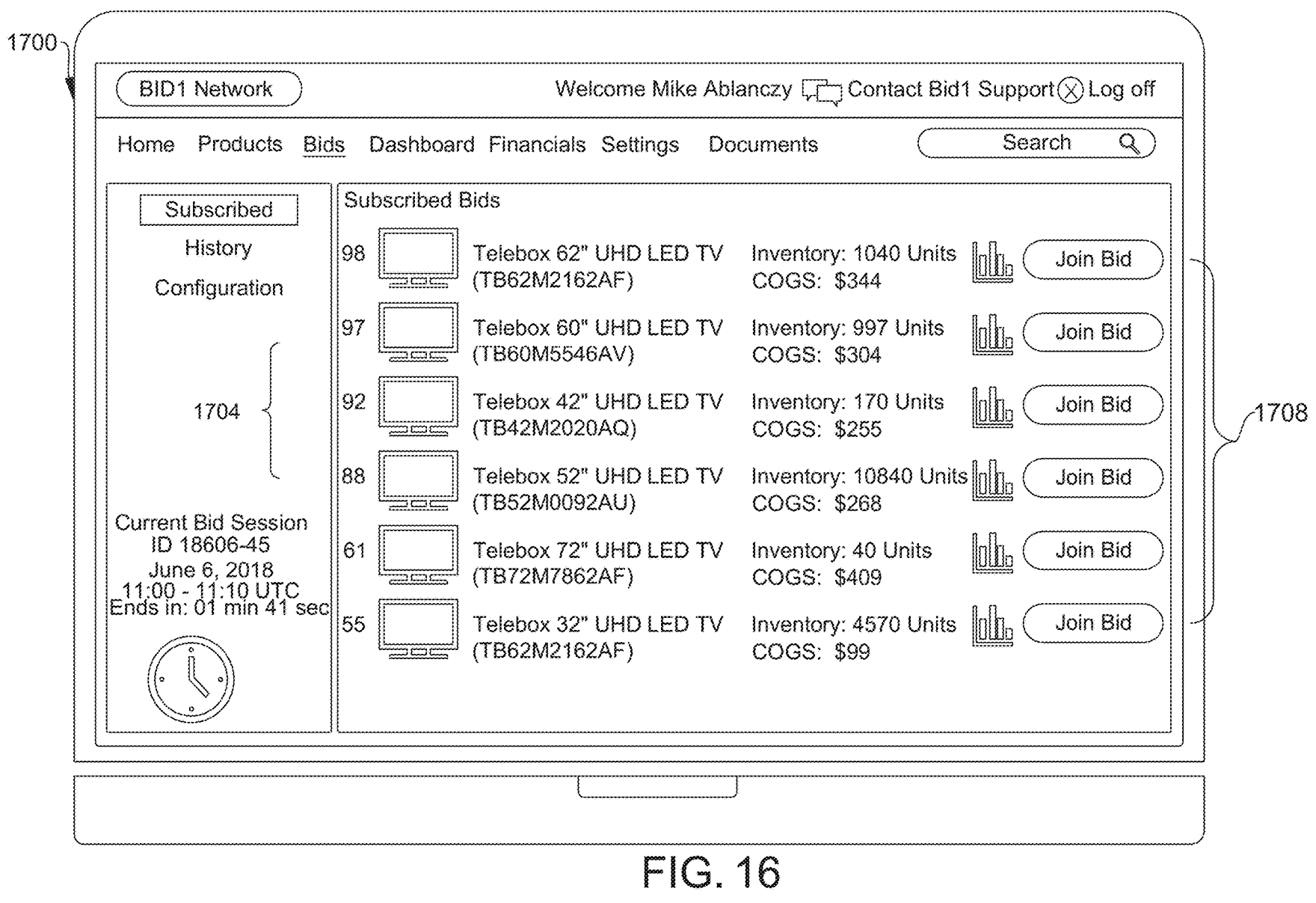

FIG. 16 illustrates a screenshot of a user interface 1700 of the platform 140 that may be accessible to a seller 202 to view items 1704 to which the seller has subscribed. For each item 1704, various information may be displayed such as items name and ID, the seller's respective in stock inventory of the items, cost of goods sold (COGS), and the like. Furthermore, any appropriate user manipulatable features 1708 (e.g., buttons, etc.) may be presented that may allow a seller to join a current bidding session for the item as discussed in more detail below. Turning back to FIG. 9, the method 500 may then include the seller monitoring 540 buyer bids for each of their subscribed items and then joining 550 an active bid session for one or more of the items (via selecting one of the buttons 1708 in FIG. 16) as discussed below.

Figure 8:
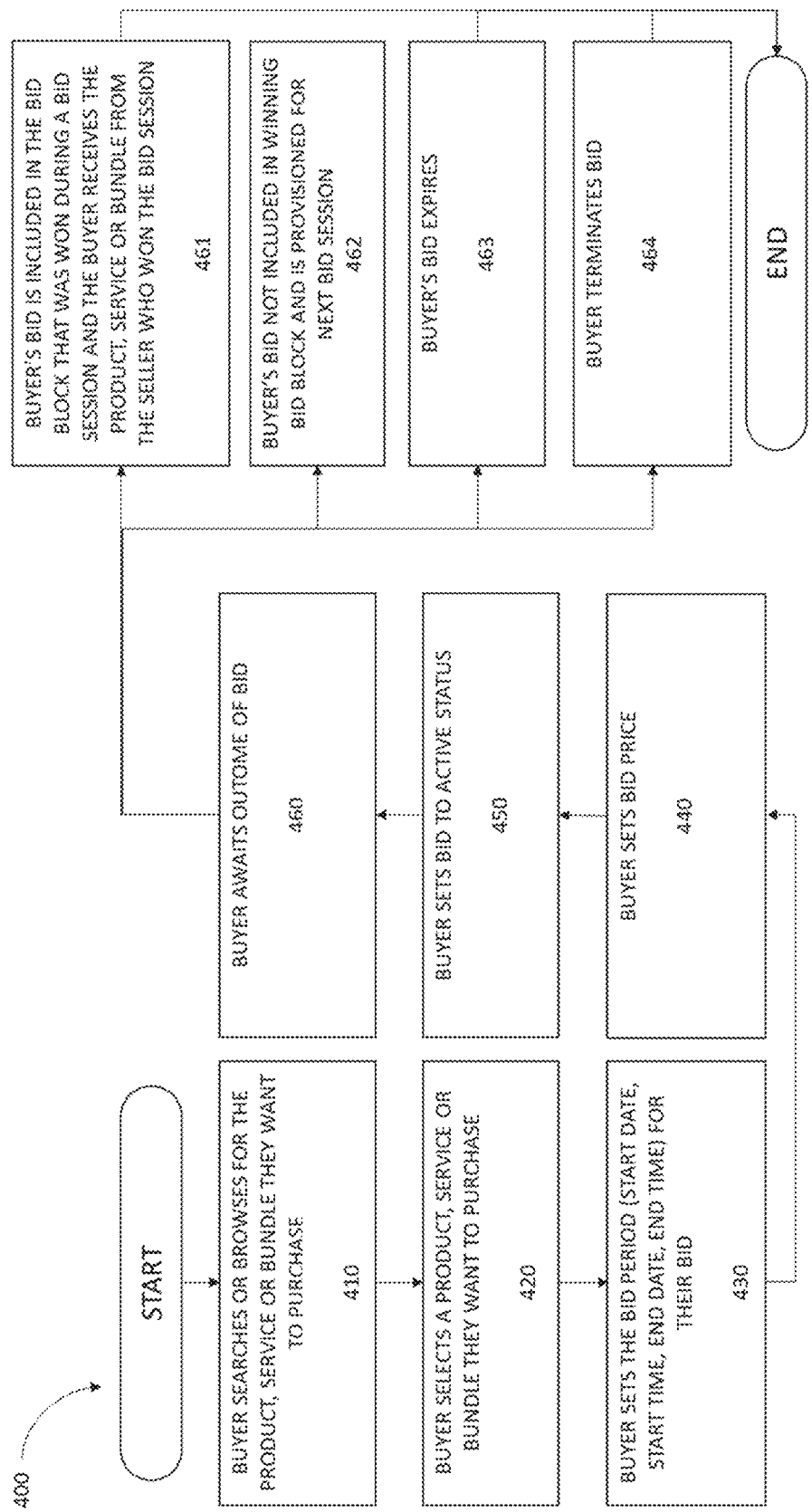
FIG. 8 is a flow diagram of a method that may be engaged in by a buyer of a bulk item on the disclosed platform.
Figure 12:
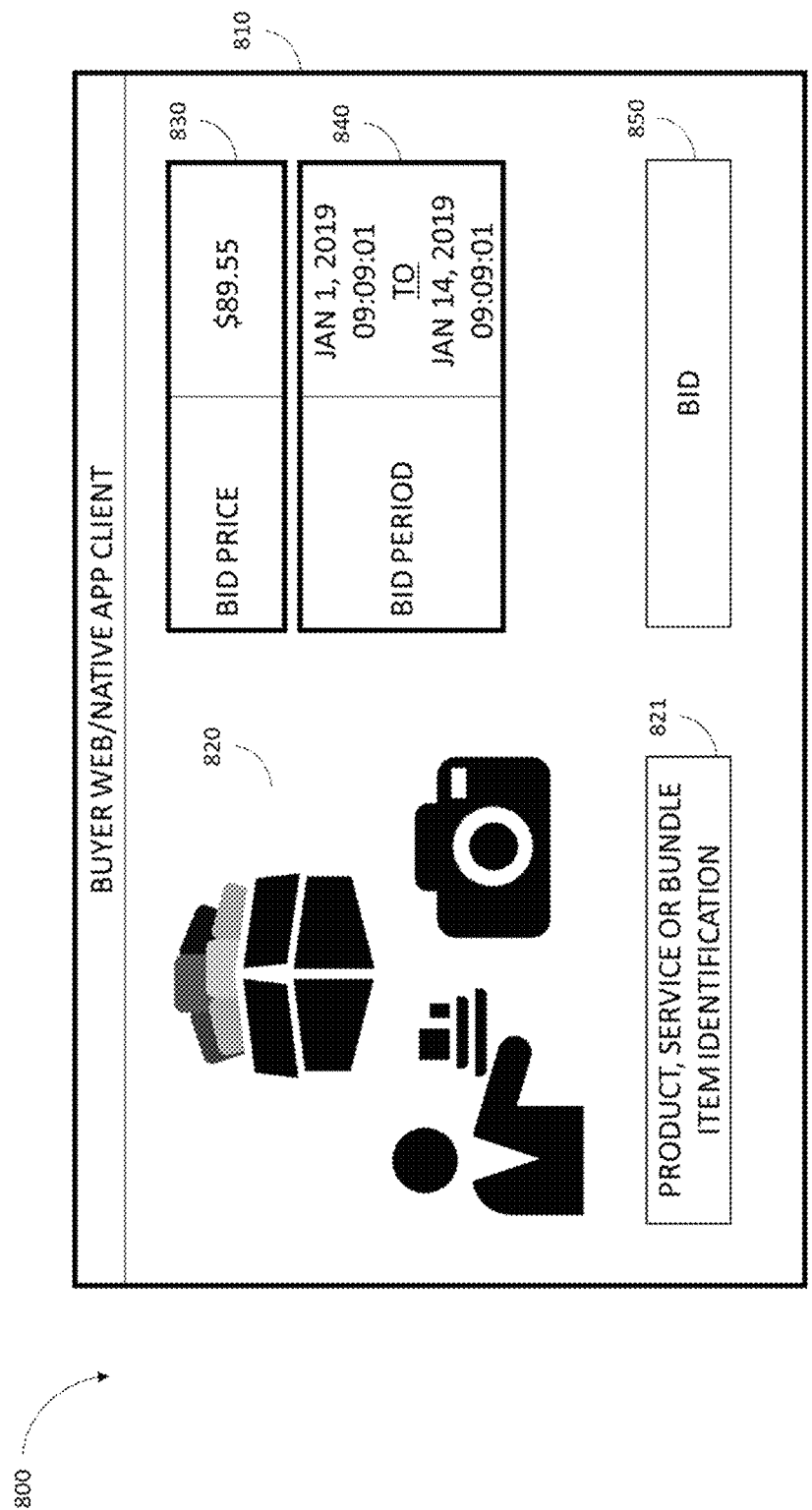
FIG. 12 illustrates a buyer web/native app client that may be used by a buyer to submit bids for an item on the disclosed platform, according to an embodiment.

On the buyer side and with reference now to the method 400 of FIG. 8, a buyer may access the platform 140 via buyer device 112 over network 230 (e.g., network 130) and search or browse 410 for at least one item that they want to purchase, select 420 the desired item, set 430 a bid period (e.g., start date, end date, end time, etc.) for the bid, set 440 the bid price, set 450 the bid to active status and submit the same, and then await 460 an outcome of the bid. For instance, FIG. 12 presents a schematic diagram 800 of a buyer web/native app client 810 that may be used by the buyer to submit bids for an item on the disclosed platform 140. As shown, a selected item 820 may have a corresponding unique identifier 821 (as to other items on the platform 140). Furthermore, the app client 810 may include one portion 830 in which the buyer may enter a bid and another portion 840 where the buyer may set the bid duration. The app client 810 may also have a user manipulatable feature 850 (e.g., button) that may allow the user to submit the bid to the platform 140 for use in a bidding session disclosed herein.

Figure 13:
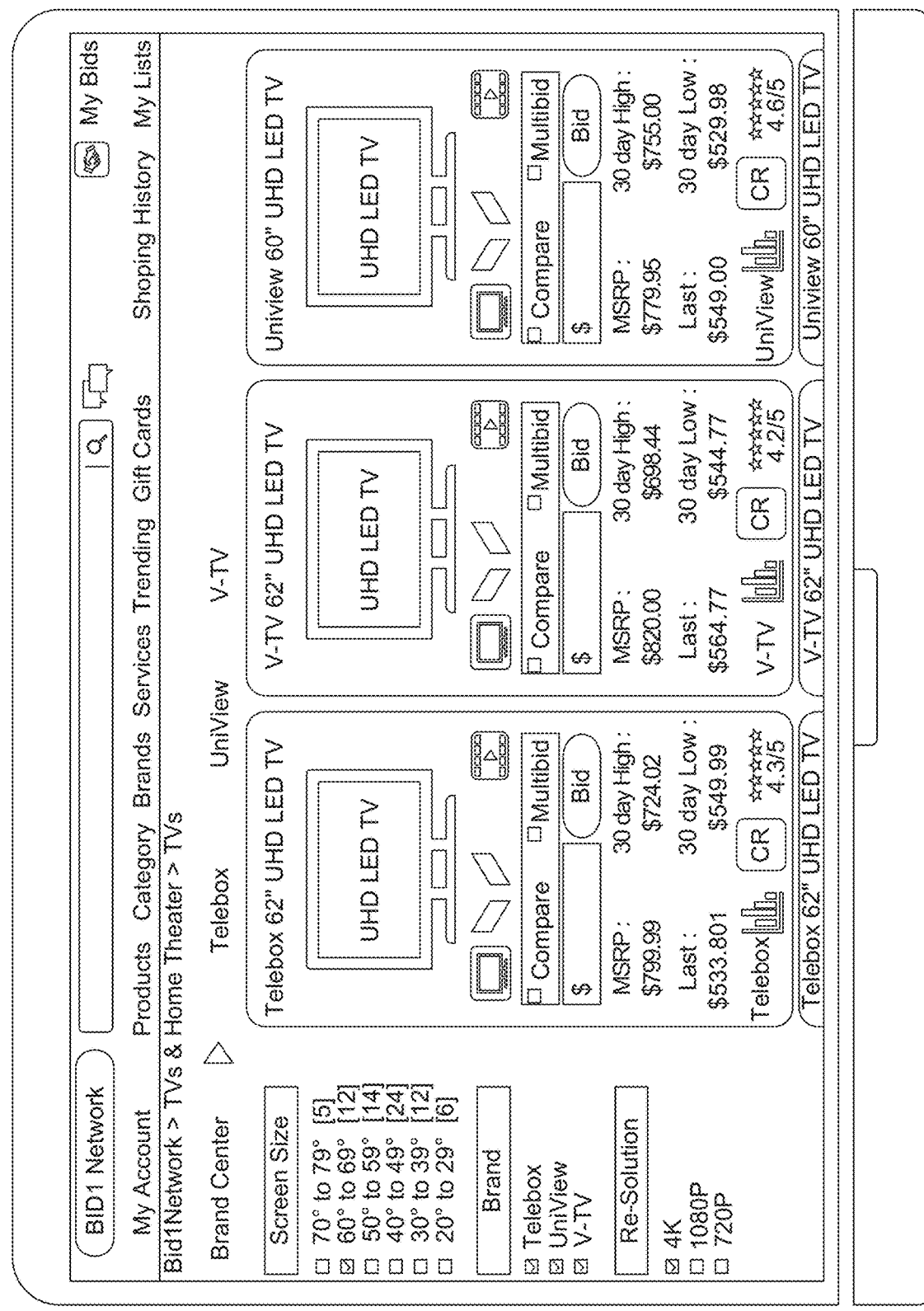
FIG. 13 is a screenshot of a user interface through which a buyer may peruse items for sale on the disclosed platform and submit bids for items, according to an embodiment.
Figure 14:
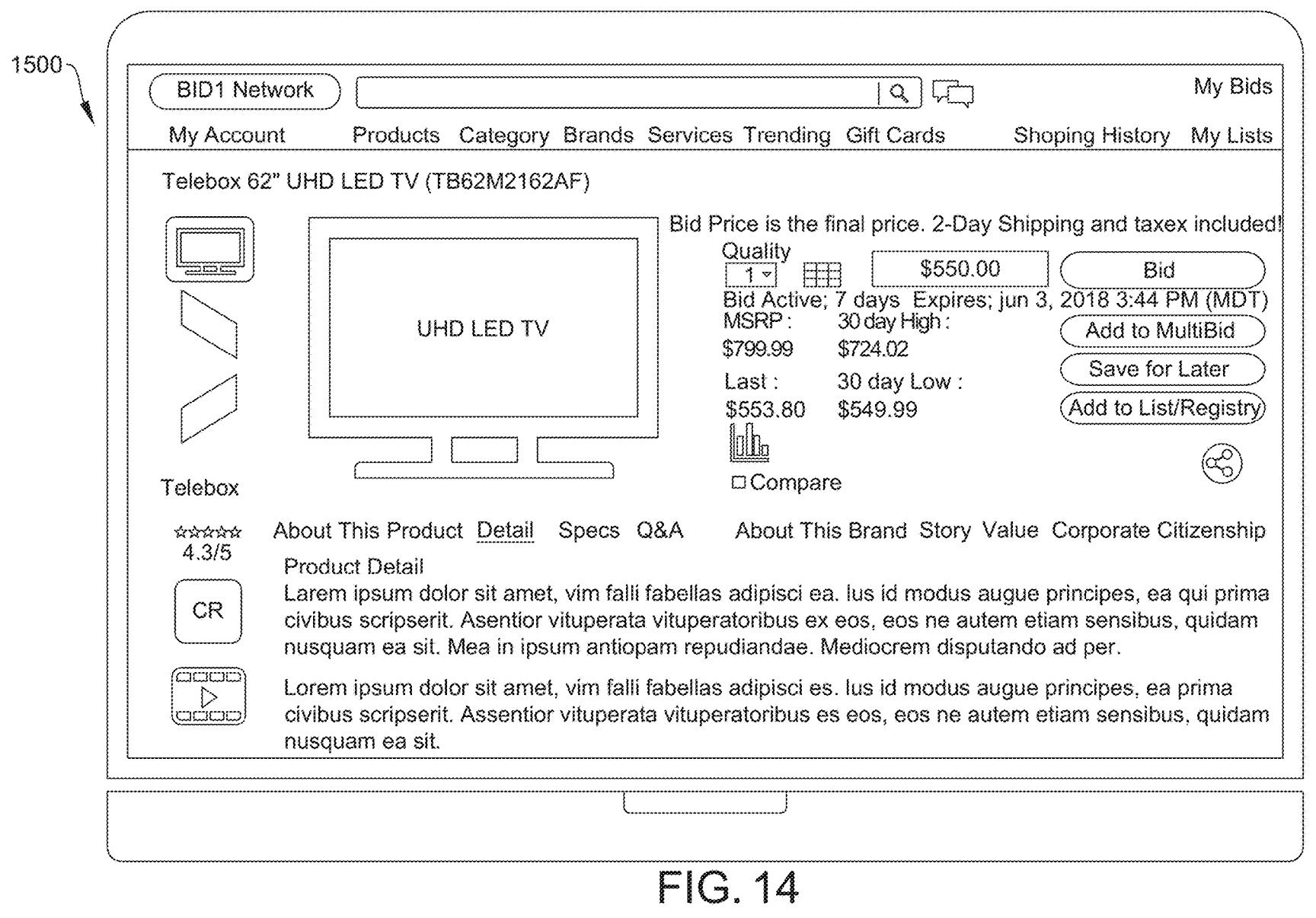

FIG. 13 presents a screenshot 1400 of a web client (e.g., browser) that a buyer may utilize to browse for items available on the platform 140. FIG. 14 presents a screenshot 1500 of the web client upon the buyer identifying a particular item. The web client may include various information to assist the buyer in deciding whether to submit a bid (e.g., MSRP, high-low prices, etc.). Before submitting a bid, each buyer may be required to register with the platform 140 by way of providing any appropriate information (e.g., name, mailing address, email address, contact name, bank account and/or credit card information) to create an account. As part of determining a particular price at which to submit a bid, a buyer's goal in one characterization may be to submit the price they are willing to pay for the item that drives down the selling price for the product through collective bargaining power with other buyers interested in the item (e.g., that they could not otherwise find through other retail sources or commerce methods).

Figure 4:
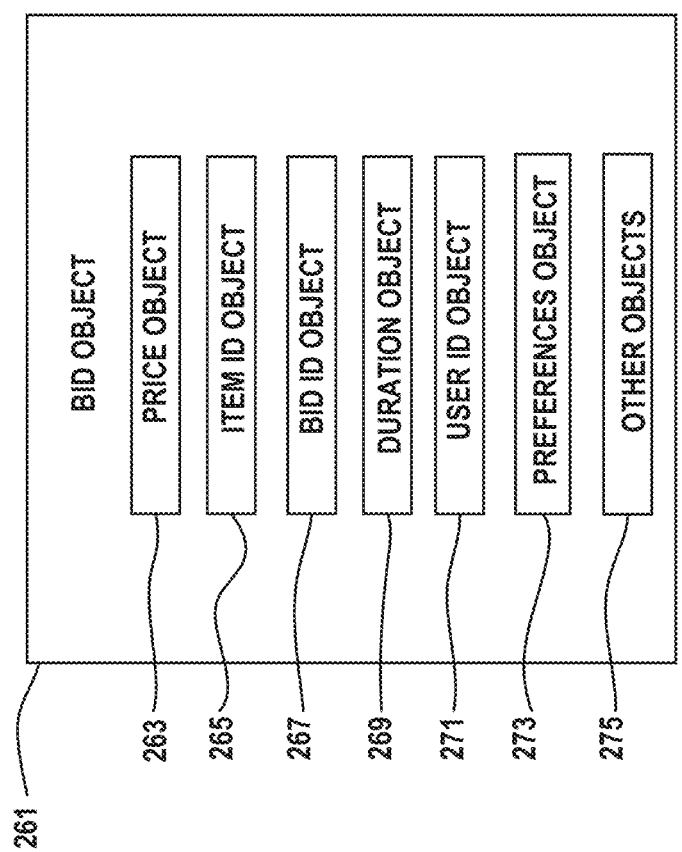
FIG. 4 is a schematic diagram of a bid object as created by a bidding engine of the platform in response to a bid submitted to the platform by a buyer.

Returning now to FIG. 2, the platform 140 may broadly be configured to manage (e.g., simultaneously) a plurality of active bid sessions 220 for a plurality of items 270 on the platform (only one active bid session 220 being shown in the interest of clarity). The bid engine 280 (e.g., bid engine 153) may generally be configured to move incoming bids for a particular item into a bid pool 222 (e.g., memory space) and organize the bids from highest price to lowest price. In one arrangement, the bid engine 280 (and/or other engines/servers disclosed herein) may be configured to build and make use of respective "bid objects" 261 (e.g., data structures) for each respective bid that each broadly includes a plurality of objects to define the respective bid. As shown in FIG. 4, each bid object 261 may for instance include a price object 263 that defines a price at or below which the respective buyer is willing to pay for the respective item, an item ID object 265 that defines an ID that uniquely defines the item for which the bid was submitted relative to other items on the platform 140, a bid ID object 267 that uniquely defines the bid relative to other bids on the platform 140, a duration object 269 that defines a period of time submitted by the buyer for which the respective bid is to be effective on the platform 140 (or time until which the bid is to be effective), a user ID object 271 that uniquely identifies the buyer/user relative to other buyers/users of the platform 140, a preferences object 273 that defines one or more various preferences of the particular buyer (e.g., such as whether a first bid for a first item of a first type is to automatically expire upon the buyer winning a second bid for a second item of the first type on the platform 140), and/or one or more other objects 275 (e.g., bid creation timestamp, etc.) that may help to define the bid and that may be generated based on information submitted by the buyer or supplied or obtained by the platform 140. Bid or bid objects that have been organized from highest to lowest price by the bid engine 280 are referred to herein as "organized bids" or "organized bid objects".

Figure 3:
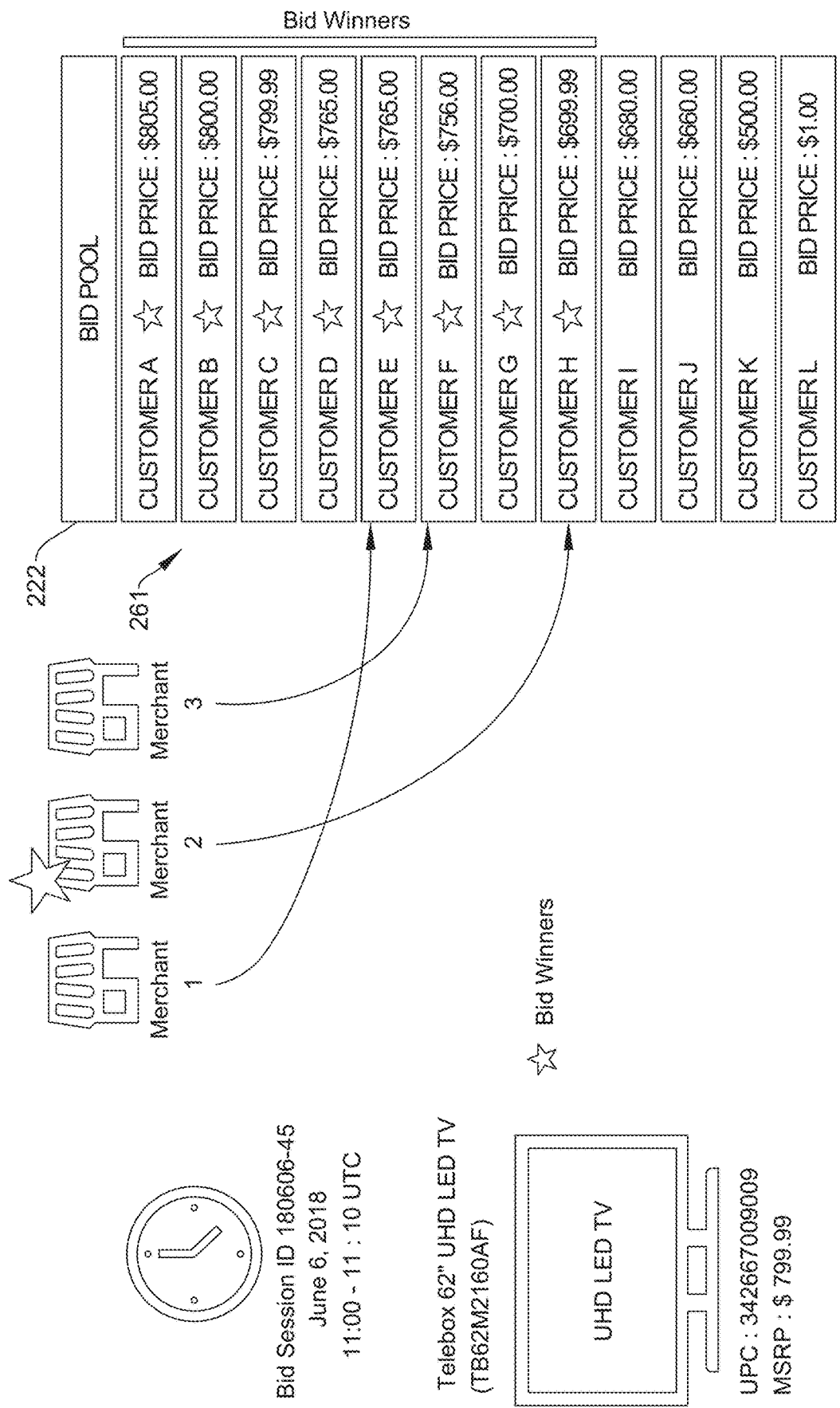
FIG. 3 illustrates how a plurality of merchant sellers may create a plurality of bid blocks from bid objects in a bidding pool for an item on the platform

Turning back to FIGS. 2 and 9 and after a seller joining 550 an active bid session for a particular item on the platform 140 (e.g., using interface of FIG. 17), the seller may create 555 a "bid block" 251 from the organized bid objects 261 in the bid pool 222, where the bid block is a group of consecutive adjacent ones of the organized bid objects. Stated differently, a bid block is a string of the organized bid objects that includes all of the bid objects between the highest price bid object and the lowest price bid object in the string (the lowest price bid object being a lowest bid object price selected by the seller). FIG. 3 schematically illustrates how each of a plurality of sellers (e.g., merchants) that have subscribed to a common item have created difference respective bid blocks from the organized bid objects in the bid pool 222. For instance, each seller may select (in any appropriate manner) the one of the organized bid objects in the bid pool 222 having the lowest price at which the seller is willing to sell the item based on the volume of bid objects including and above the selected bid object up to the most expensive one of the organized bid objects. The volume of bid objects including and above the selected bid object up to the most expensive one of the organized bid objects represents a bid block for the respective seller.

Figure 11:
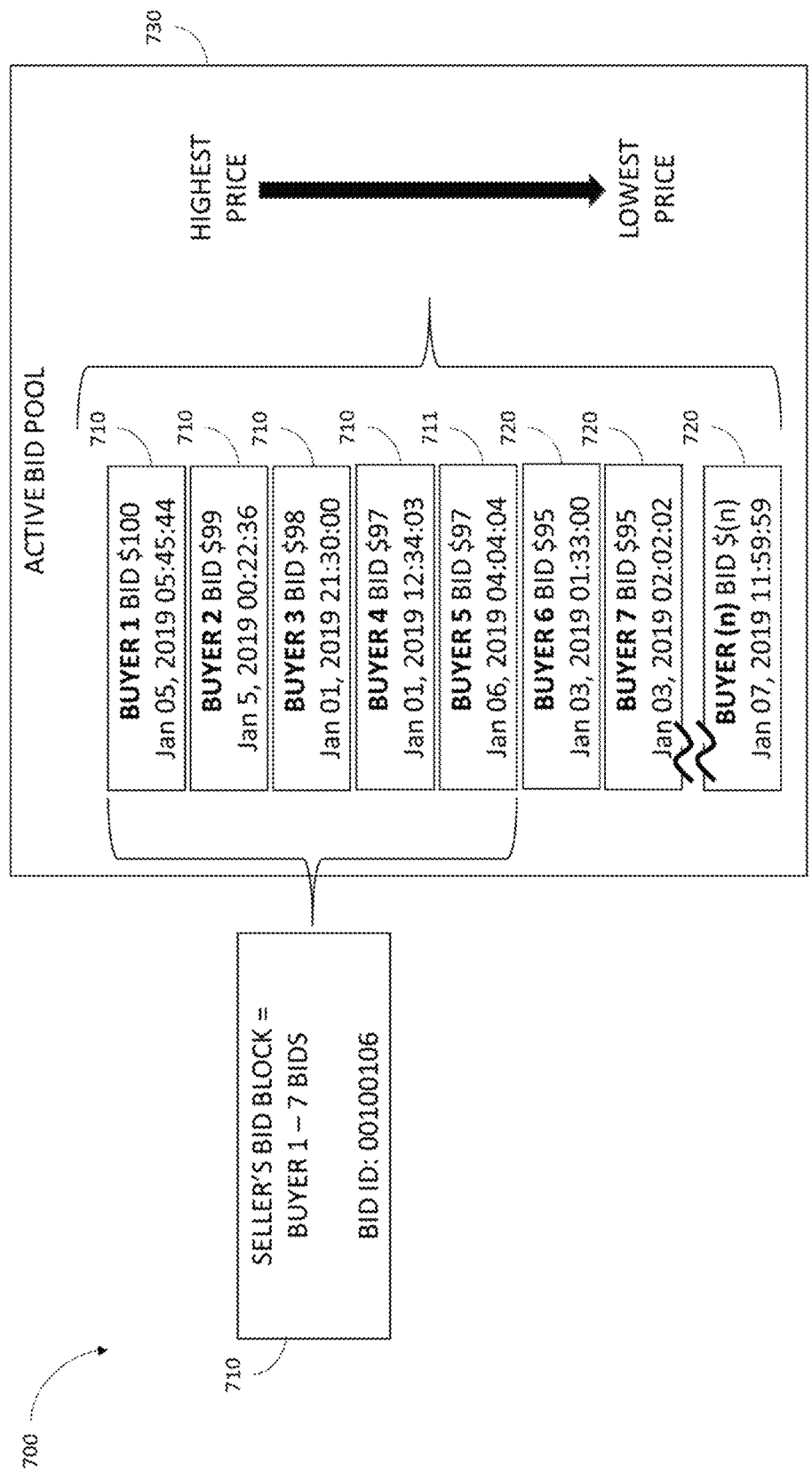
FIG. 11 illustrates a plurality of exemplary buyer bids submitted to the disclosed platform as well as a seller bid block that includes a subset of the buyer bids.

In this example, Merchant 1 has selected the bid object 261 associated with customer/buyer E at a bid price of $765, Merchant 2 has selected the bid object 261 associated with customer/buyer H at a bid price of $699.99, and Merchant 3 has selected the bid object 261 associated with customer/buyer F at a bid price of $756. In one characterization, each seller's goal may be to select a particular one of the bid objects to create a respective bid block that offers the best ratio of price to volume they can provision based on current demand to maximize direct margins on bid transactions. Each seller may submit their bid object selections during an active bidding session and thereby create their respective bid blocks manually or via API for instance (e.g., where the API could execute rules to automatically create bid block based on item, bid object price, number of bid objects and thus buyers in the bid block, etc.). FIG. 11 presents another schematic diagram 700 illustrating a seller's bid block 710 defined by a selected bid object 711 (e.g., a seller bottom bid price) in a bid pool 730 as well as bid objects 710 above the selected bid object 711. Bid objects 720 are not included in the seller's bid block.

At step 560 in FIG. 9, it may be queried whether each seller's bid block conflicts with that of another seller's (e.g., whether a subsequent seller selected the same bid object as a prior seller during the bid session). If so, the seller may be prompted by the platform 140 to select another one of the organized bid objects and thereby create another bid block. Otherwise, the method 500 may proceed to confirm 570 each of the seller bid blocks for the particular active bid session 220 whereby each seller may await 580 an outcome of the active bid session 220. During the active bid session 220, each seller may be unaware as to the bid blocks being created by the other sellers.

At a conclusion of the particular active bidding session 220, the bidding engine 280 may automatically identify the lowest (cheapest) selected bid object (or in other words the bid block with the most bid objects of all of the bid blocks) and then generate an indication regarding the same. For instance, the generated indication may be in the form of any appropriate data structure identifying the particular seller (e.g., a seller ID) associated with the identified bid object, the price of the bid object, all other bid objects above the selected bid objects and their corresponding prices and seller IDs, item ID, buyer IDs of all bid objects in the winning bid block, and/or the like. Turning back to FIG. 3, the winning bid block may for instance be that associated with Merchant 2 and include the bid objects 261 associated with customer/buyer H up through customer/buyer A.

Referring again to the method 500 of FIG. 9 in response to querying 590 (for each seller) whether the seller won the active bid session 220, the seller may be required to provision 591 the item to each of the buyers associated with each of the bid blocks in the winning bid block (e.g., in the case of Merchant 2). For instance, as part of registering with the platform 140, each buyer may be required to submit mailing address, payment information, etc. which may be stored in the database(s) 145 or elsewhere. The platform 140 may automatically associate each such set of information with a unique buyer or user ID which may be included in each bid submitted by the buyer (and thus be found in each bid object 261 created by the platform 140. Accordingly, upon winning a particular bidding session, the platform 140 may be configured to utilize the particular user ID object 271 of each bid object 261 in the winning bid block to access the mailing address (and other pertinent information of the buyer) and send the same to the winning seller for the winning seller's use in shipping the corresponding item to the buyer. The platform may facilitate payment as a third-party intermediary such that payments flow through the platform (ecommerce provider) rather than directly from buyers to the seller. For all other sellers of the active bidding session 220 (e.g., Merchants 1 and 3), such sellers would not provision 592 the items to buyers as part of this active bidding session 220.

Figure 15:
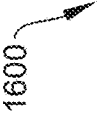
FIG. 15 is a screenshot of the user interface of FIG. 14 after the disclosed platform has determined that the buyer won the item for which a bid was submitted.

In one arrangement, the winning seller may be required to sell the item to each buyer in the winning bid block at the lowest bid price in the bid block. In other arrangement, the winning seller may sell the item to each buyer in the winning bid block at the respective bid price submitted by the respective buyer. From the buyer's perspective and referring to the method 400 of FIG. 8 and if the buyer's bid is included 461 in the winning bid block, the buyer may receive the corresponding item from the winning seller discussed above. As an example, FIG. 15 presents a screenshot 1600 of a user interface that may be presented on each winning buyer's device and that presents various information for use by the buyer. In the case where the seller was required to sell the item to each buyer at the lowest bid price in the bid block, the interface may indicate how much the respective buyer saved relative to their submitted bid. Other displayed information may include a breakdown of the purchase price (e.g., product, taxes, etc.), protection plans, etc. The interface may also include a "checkout" button that when manipulated brings the buyer to a payment page to purchase the product. Other possible outcomes include the buyer's bid not being included 462 in the winning bid block whereupon the buyer's bid may be provisioned for a subsequent bidding session for the item, the buyer's bid expiring 463, or the buyer terminating 464 their bid.

Returning to FIG. 2, the platform 140 may maintain a number of data structures for use by the bid engine 280 in managing the bilateral bidding sessions such as a bid session ID 223 (e.g., identification that uniquely identifies each bid session, a bid session period 224 (e.g., length of the particular bid session), a bid session cyclic schedule 240 (e.g., period the ecommerce marketplace provider establishes (e.g., start date, start time, end date, end time) to conduct the bilateral bid auctioning process, where the process is cyclic), current date 225, and current time 226. For instance, each respective adjacent pair of bid sessions may be identical but non-overlapping periods of time.

Figure 6:
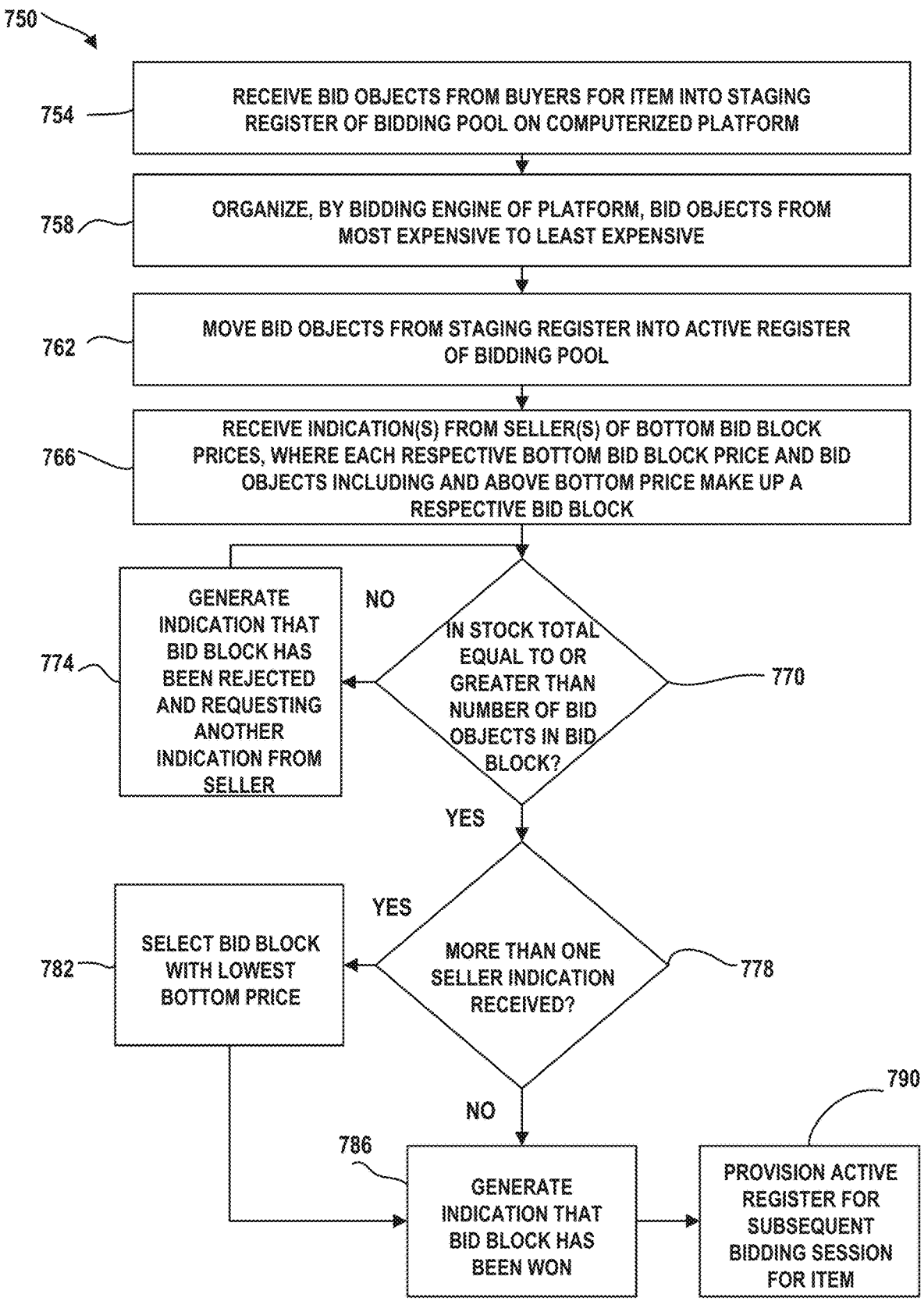
FIG. 6 is a flow diagram of a method that may be employed by the disclosed platform for facilitating a bilateral bidding process between buyers and sellers during a bidding session for bulk items.

FIG. 6 presents a flow diagram of a method 750 for use by the platform 140 in conducting a bilateral bidding process for one type of item as discussed herein. It is to be understood that the platform 140 may respectively engage in the method 750 for a plurality of different types of items simultaneously, sequentially, and/or the like. At step 754, the platform 140 may receive a plurality bid objects from buyers (e.g., or as created by the platform 140 in response to receiving bids from buyers) for an item and into a staging register of a bidding pool. With reference to FIG. 3, a bidding pool 320 (e.g., bidding pool 222 of FIG. 2) for a particular item 310 may include a staging register 322 and a separate active register 321, where each of the registers may be in the form of discrete memory spaces for use by the bidding engine 280 to conduct bilateral bidding sessions. For instance, new buyer bids 340 may be received and corresponding bid objects 261 may be disposed into the staging register 322.

The method 750 may then include the bidding engine organizing 758 the bid objects 261 from the most to the least expensive or in other words organizing the bid objects from the bid object 261 having the price object 263 (see FIG. 4) with the highest price and continuing to the bid object 261 having the price object 263 with the lowest price (e.g., similar to the bid objects in FIGS. 2, 3, and 11). In the case where two or more bid objects are received or created that all of the same price, the bid engine 280 may automatically arrange such bid objects in order of their time stamps or in other words when they were received by the platform 140 (or created by the buyers). For instance, the one of such bid objects having the earliest time may be placed highest in the organized list (i.e., closer to the most expensive bid object that the other ones of such bid objects) to increase the likelihood that such bid object is included in a winning bid block (assuming such respective buyer should get a benefit by being the first one to submit a bid object at such price). While the method discusses moving and organizing the bid objects 261 themselves, it is to be understood that each bid object 261 in some arrangements may merely be represented in the bid pool 320 via the bid ID object 267 or other unique identifier, where other objects that define each bid object 261 may be stored in the database(s) 145 or elsewhere and accessed using the bid ID as a key or the like.

At or just before a beginning of a next active bid session (e.g., as known by the bid session cyclic schedule 240), the bidding engine 280 may move 762 the bid objects 261 from the staging register 322 into the active register 321, the bid objects 261 also being organized from most to least expensive in the active register 321. Once the bid objects 261 have been moved into the active register 321 and the next (now current) active bid session has begun, the bidding engine 280 may "lock" the active register 321 from addition of new bid objects 261 into the active register 321 and removal of existing bid objects from the active register 321 during the current active bid session. In this regard, new bid objects 261 received by the platform 140 for a particular item while a current bid session is being conducted for the same particular item are placed into the staging register 261 of the bid pool 320 for the same particular item in preparation for a subsequent bid session for the item. In one arrangement, the bid engine 280 may constantly organize the bid objects 261 in the staging area from most to least expensive. In other arrangement, the bid engine 280 may organize the bid objects 261 from most to least expensive at or just prior to movement of the bid objects 261 from the staging register 322 into the active register 321 for a next active bid session.

At 766, the method 750 may include receiving respective indications from respective sellers of bottom bid block prices, where each respective bottom bid block price and the bid objects above the bottom price (i.e., the more expensive bid objects) make up a respective bid block. In other words, the platform 140 may receive indications from respective sellers of different respective ones of the bid objects in the organized bid object list in the active register 321, where different respective bid blocks are created for each seller. For instance, see bid blocks 221 in FIG. 2 and bid block 710 in FIG. 11. Generally, only one seller may select each bid object 261 in the active register 321 such that each respective bid block is at least slightly different from all of the other bid blocks. In the case where two sellers attempt to select the same bid object, the bid engine will grant the bid object (and the bid block created from the bid object) to the received seller indication having the earliest time stamp and then generate and send an indication to the other seller to make another selection. Each seller may generally be unaware of whether any other sellers are also making selections during the current active bid session.

In one arrangement, the bid engine 280 (or a seller's API) may be configured to automatically adjust the seller's bid block based on seller preferences embodied in any appropriate rules as applied by the bid engine 280 or seller's API. As an example, in an effort to ensure that a seller's bid block wins the current bidding session, the seller may establish preferences on the platform 140 (e.g., stored on database(s) 145) dictating that the seller approves for the seller's bid block to automatically increase in size (e.g., by automatically reducing the seller's bottom bid object price) in response to another seller selecting a lower bottom bid object price. For instance, a seller could establish a rule that in the event another seller establishes a lower bottom bid object prices, the seller's bottom price is to automatically be adjusted (thus increasing the seller's bid block) to the next bid object below the other seller's bottom bid object) in the organize list of bid object, but not below a particular price. The seller may establish such preferences based on desired price to volume ratios it is seeking to achieve.

At or before an end of the current bid session, the method 750 (e.g., the bid engine) may query 770 whether each seller's in stock total of the particular item is greater than or equal to the number of bid objects in the seller's respective bid block. With reference to FIG. 3, for instance, the bid engine 280 may query whether Merchant 1's in-stock total of the particular item ("Telebox 62 inch TV" in the example) is equal to or greater than five, Merchant 2's in-stock total is equal to or greater than eight, and the like. Seller in-stock totals for various items may be maintained in the database(s) 145 or the like. For instance, the screenshot 1700 of FIG. 16 illustrates a particular seller's in-stock totals ("inventory") for various types of TVs being sold on the platform 140. In response to a negative answer to the query 770, the bid engine 280 may generate 774 an indication that the particular bid block has been rejected due to insufficient inventory and then request another indication from the seller (i.e., another bottom price bid object).

Figure 5:
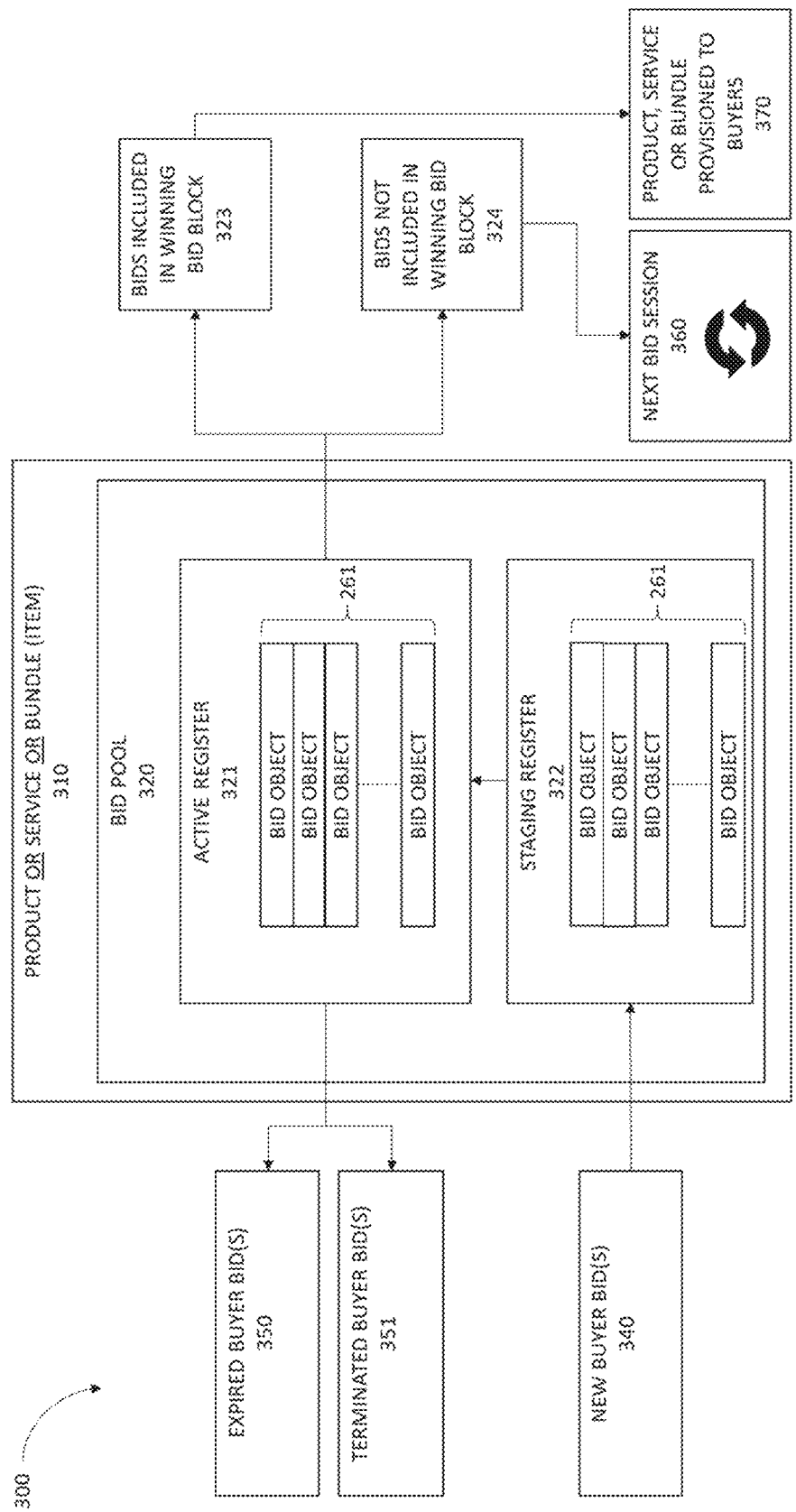
FIG. 5 is another schematic diagram illustrating active and staging registers of a bidding pool for an item in the platform.

At the end of the current bid session, the method 778 may query 778 whether more than one seller indication has been received or in other words whether more than one bid block was created during the bid session. If no (e.g., only one bid block was created), the bid engine 280 may then generate in indication to the single winning seller that the bid block was won (where the seller would then need to provision the items to the buyers in the bid block as discussed herein) and then the method may proceed to provision 790 the active register 321 for the subsequent bidding session for the item. If no indications were received (no bid blocks created during bid session), the method may proceed directly to step 790 without generating an indication regarding a winning bid block. If the answer to the query 778 is yes such that more than one seller indications were received (i.e., plurality bid blocks created by bid engine), then the bid engine 782 may automatically select 782 the one of the bid blocks having the lowest bottom price (i.e., the cheapest bid object 261) and then generate 786 an indication to the particular seller that selected the cheapest bid object 261 that their respective bid block has won the current active bid session. For instance, FIG. 5 illustrates how bids 323 included in the winning bid block (e.g., the winning bid objects 261) may be used to provision 370 the particular item to the buyers associated with the winning bids while bids 324 not included in the winning bid block (e.g., the bid objects 261 not included in the winning bid block) may be provisioned for a next bid session 360. FIG. 9 presents a table 600 illustrating a plurality of bid session use cases 610-690 that may take place on the platform at a conclusion of each respective bid session.

Figure 7:
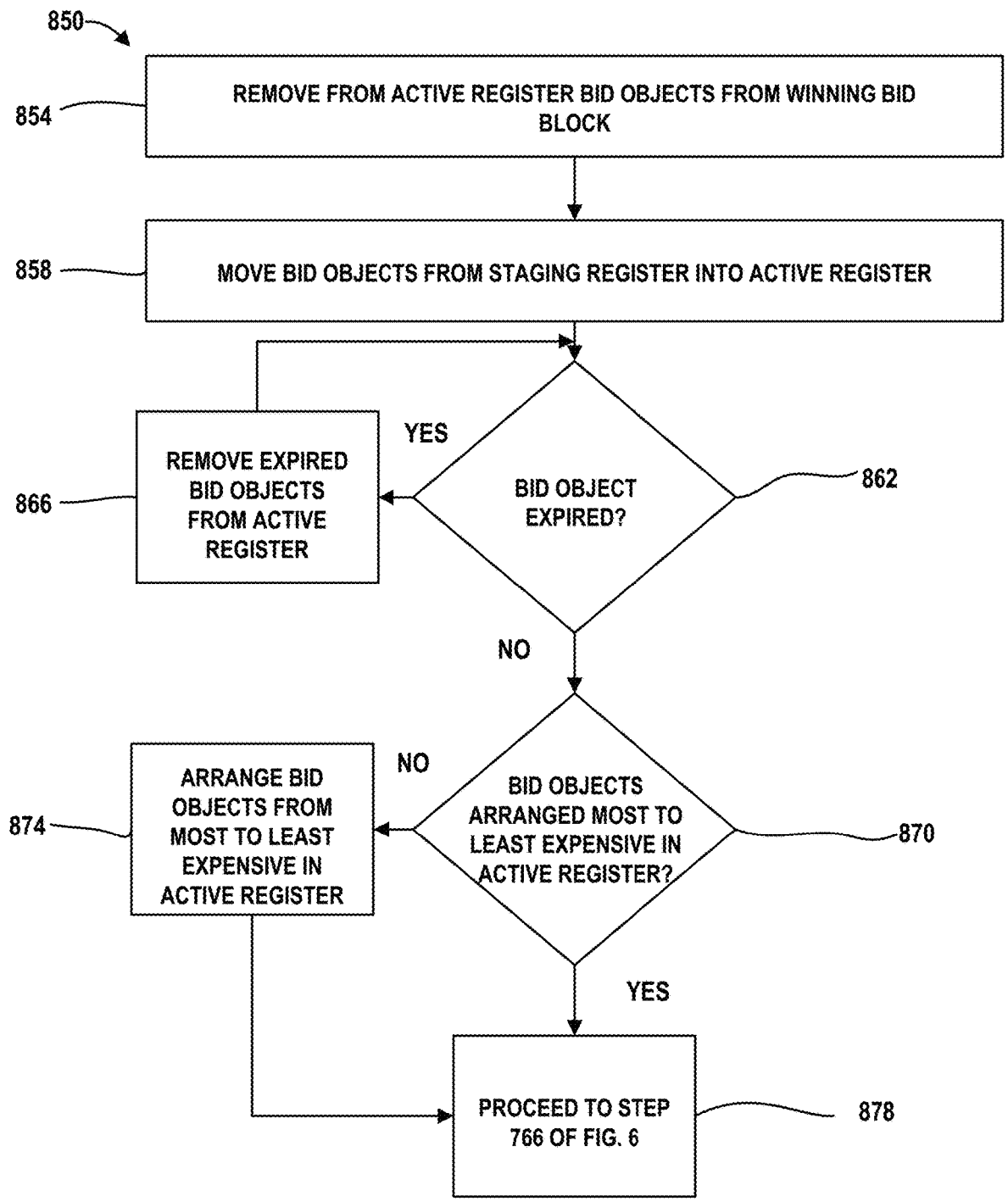
FIG. 7 is a flow diagram of a method of provisioning an active register of a bidding pool for use in a subsequent bidding session.

FIG. 7 illustrates a flow diagram of a method 850 of provisioning the active register 321 of the bidding pool 320 for use in a subsequent bidding session for the same particular item (where the provisioning occurs before a start of the subsequent bidding session). The method 850 may include removing 854 from the active register 321 any bid objects that were included in the winning bid block from the immediately previous bid session. In the example of FIG. 3 where Merchant 2 won the bid session and all of the bid objects were in the active register 321 of FIG. 5, the bid objects associated with all of Customers A-H may be removed leaving the bid objects associated with Customers I-L. Furthermore, any bid objects 261 that had accrued in the staging register 322 during the previous bid session may be moved 858 into the active register. Another step of the method 850 may include querying 862 whether any bid objects have expired. For instance, the bid engine 280 may access the duration object 269 of each bid object 261 to determine whether or not the bid object 261 has expired. Part of this process may include the bid engine 280 accessing the current date 225 and current time 226 as maintained by the platform 140.

As another example, the bid engine 280 may access the preferences object 273 of each bid object 261 to determine whether the bid object has expired. For instance, in the case where the preferences object 261 for a particular bid object indicates the bid object 261 is to expire if another bid object 261 of the buyer in another bid pool for another type of item was previously include in a winning bid block. If so, the first bid object 261 may expire. The bid engine 280 may analyze each of the bid objects 261 in this manner and remove 866 any expired bid objects. For instance, FIG. 5 illustrates expired and terminated bid objects 350, 351. In some arrangements, the bid engine 280 may analyze the bid objects 261 for expiration before moving the bid objects 261 from the staging register 322 into the active register 321. The method 850 may also query 870 whether the bid objects 261 are arranged from most to least expensive in the active register 321 and organize or arrange 874 them in this way if not. In any case, active register 321 may now be provisioned or in other words prepared for the subsequent bidding session for the particular item and the method 878 may then proceed to step 766 of FIG. 7 for the subsequent (now active) bidding session.

In one embodiment, the bid engine 280 may create or make use of a different respective pair of staging and active registers 322, 321 for a particular item during each subsequent bidding session for the item. For instance, as part of provisioning the bidding pool for a subsequent bidding session, the bid engine 280 may move remaining (and unexpired) bid objects from the active register 321 of the previous bid session into the active register 321 of the subsequent bid session. Furthermore, bid objects 261 received at the platform for a particular item during the prior bid session for the item would be received and stored into the staging register 322 for the subsequent bid session rather than for the prior bid session. In this regard, the bid engine would move unexpired bid objects from the staging register 322 of the subsequent bid session into the active register 321 for the subsequent bid session as part of provisioning the active register for a beginning of the subsequent bid session.

In some variations, the API server(s) 142 can include an ERP API to interface with the seller's ERP system 125. In some versions, the servers through the API receive UPC codes and quantities of goods of various types from the seller's/merchant's ERP 125. The system may then associate the items with current listings or even automatically create new listings. The merchant ERP's 125 may include pricing rules for each item or the merchant may direct the servers to selectively include its items in the active listings or begin bid sessions for new listings. In at least some embodiments, sellers can request analytics from the platform 140 server(s) concerning a whole host of information about the items it has listed and sold as well as historical information concerning the performance of bid sessions for a certain item. Based on trends and historical data, the sellers can more accurately gauge demand and market price for a particular item or class of particular items.

The disclosed utilities are integrated into a practical and non-conventional application by facilitating a bilateral bidding process between sellers and buyers that allows buyers to obtain lower prices on the items through crowd bidding while simultaneously allowing sellers to essentially offset such lower prices on the items through increased sales volume of the items. Specifically, the dynamic and systematic manner in which the disclosed platform introduces bid objects into the bidding pool and organizes them from most to least expensive, receives seller offers to sell different respective blocks of the bids in the pool, identifies a winning bid block and then provisions the bid pool for subsequent cyclical bidding sessions for the same type of item (e.g., by way of analyzing duration and preference objects of the bid objects to remove expired bid objects, introduce accumulated new bid objects, etc.) is non-conventional and therefore presents an inventive technical innovation.

It will be readily appreciated that many deviations may be made from the specific embodiments disclosed in the specification without departing from the spirit and scope of the invention. The illustrations and discussion herein have only been provided to assist the reader in understanding the various aspects of the present disclosure. Furthermore, one or more various combinations of the above discussed arrangements and embodiments are also envisioned.

Embodiments disclosed herein (e.g., the bidding engine 280) can be implemented as one or more computer program products, i.e., one or more modules of computer program instructions encoded on a computer-readable medium for execution by, or to control the operation of, data processing apparatus (processors, cores, etc.). The computer-readable medium can be a machine-readable storage device, a machine-readable storage substrate, a memory device, a composition of matter affecting a machine-readable propagated signal, or a combination of one or more of them. In addition to hardware, code that creates an execution environment for the computer program in question may be provided, e.g., code that constitutes processor firmware, a protocol stack, a database management system, an operating system, or a combination of one or more of them.

A computer program (also known as a program, software, software application, script, or code) used to provide the functionality described herein can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

While this disclosure contains many specifics, these should not be construed as limitations on the scope of the disclosure or of what may be claimed, but rather as descriptions of features specific to particular embodiments of the disclosure. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method in a computerized bidding system positioned remotely from, and in communication via the Internet with, a seller device and buyer devices, the method facilitating the bulk sale of an item from a seller to a plurality of buyers in an electronic marketplace utilizing an Internet platform, the method comprising:
    causing a seller user interface to be displayed to the seller on a display device associated with the seller device;
    receiving, via the seller user interface, a signal representative of a subscription by the seller to one or more items available for purchase by the buyers;
    causing a buyer user interface having a list of the one or more items being offered for sale by the seller to be displayed to the buyers on respective display devices associated with the buyer devices;
    receiving, via the buyer user interface and into a staging register of a bidding pool of the computerized bidding system, a plurality of bid objects for a particular item from a respective plurality of potential buyers, wherein each bid object includes a price object defining a price at or below which one or more of the respective plurality of potential buyers is willing to pay for the particular item;
    organizing, automatically by a bidding engine stored in memory of the computerized bidding system, the bid objects in the staging register starting with the bid object having a price object with a highest price and continuing to the bid object having a price object with the lowest price, wherein the bid objects in the staging register after being organized comprise organized bid objects;
    moving, by the bidding engine at the beginning of a bid session, the organized bid objects into an active register of the bidding pool;
    providing access to the seller to real time demand/price ratio information from the buyers, wherein the providing includes at least:
        receiving, by the bidding engine via the seller user interface during the bid session, an indication of a particular one of the bid objects in the active register from a potential seller of the particular item, wherein the particular one of the bid objects and the bid objects above the particular bid object up to the bid object having the price object with the highest price comprises a bid block; and
        enabling an optimum price that the buyers are willing to pay for the particular item to be determined by the seller; and
    generating, by the bidding engine at a conclusion of the bid session, an indication of the bid block.

2. The method of claim 1, further including:
    removing, from the active register by the bidding engine at the end of the bid session, the bid objects of the bid block, wherein the bid objects in the active register remaining after the removing comprise remaining bid objects;
    receiving, by the bidding engine during a subsequent bid session, an indication of a particular one of the remaining bid objects in the active register, wherein the particular one of the remaining bid objects and the remaining bid objects above the particular remaining bid object up to the remaining bid object having the price object with the highest price comprise a subsequent bid block; and
    generating, by the bidding engine, an indication of the subsequent bid block.

3. The method of claim 2, wherein the bid session occurs for a first predetermined period of time, wherein the subsequent bid session occurs for a second predetermined period of time, and wherein the bid session and subsequent bid session are non-overlapping.

4. The method of claim 3, wherein the end of the bid session is adjacent a beginning of the subsequent bid session.

5. The method of claim 3, wherein the first predetermined period of time is equal to the second predetermined period of time.

6. The method of claim 2, wherein each bid object further includes a bid duration object defining a period of time that the bid object is valid in the bidding pool, and wherein the method further includes:
    identifying any bid objects in the active register at the end of the bid session that have expired bid period objects and that are not in the bid block, wherein the removing includes removing the identified bid blocks having expired bid period objects.

7. The method of claim 2, further including:
receiving, into the staging register during the bid session of the active register, a plurality of additional bid objects for the particular item; and
moving, by the bidding engine at the beginning of the subsequent bid session, the plurality of additional bid objects into the active register, wherein the moved plurality of additional bid objects and the bid objects in the active register remaining after the removing comprise the remaining bid objects, and wherein the remaining bid objects are organized with the remaining bid object having a price object with a highest price and continuing to the remaining bid object having a price object with the lowest price.

8. The method of claim 1, further including:
disallowing receipt of bid objects from the staging register into the active register during the bid session.

9. The method of claim 1, wherein the computerized bidding system is further in communication with a plurality of seller devices, the method further facilitating the bulk sale of an item from a plurality of sellers to the plurality of buyers in the electronic marketplace utilizing the Internet platform, wherein causing the seller user interface to be displayed includes causing the seller user interface to be displayed on respective display devices associated with the plurality of seller devices, and wherein receiving the signal representative of the subscription includes receiving signals representative of subscriptions by the plurality of sellers to the one or more items available for purchase by the buyers.

10. The method of claim 9, wherein receiving the indication of a particular one of the bid objects in the active register from the potential seller of the particular item includes receiving, by the bidding engine during the bid session, a plurality of indications of a respective plurality of different ones of the bid objects in the active register from a respective plurality of potential sellers of the particular item, wherein each different bid object and the bid objects above the different bid object up to the bid object having the price object with the highest price comprises a different respective bid block resulting in a plurality of different bid blocks, and wherein the method further includes:
identifying, at a conclusion of the bid session, the one of the plurality of different bid blocks having a bid object with a price object having the lowest price, wherein the generating includes generating, by the bidding engine, an indication of the identified one of the plurality of different bid objects.

11. The method of claim 10, further including:
removing, from the active register by the bidding engine at the end of the bid session, the bid objects of the identified bid block, wherein the bid objects in the active register remaining after the removing comprise remaining bid objects;
receiving, by the bidding engine during a subsequent bid session, a plurality of indications of a respective plurality of different ones of the remaining bid objects in the active register, wherein each different remaining bid object and the remaining bid objects above the different remaining bid object up to the remaining bid object having the price object with the highest price comprises a different respective bid block resulting in a plurality of different bid blocks of the subsequent bid session;
identifying, at a conclusion of the subsequent bid session, the one of the plurality of different bid blocks having a remaining bid object with a price object having the lowest price; and
generating, by the bidding engine, an indication of the identified bid block of the subsequent bid session.

12. The method of claim 11, wherein each bid object further includes a bid duration object defining a period of time that the bid object is valid in the bidding pool, and wherein the method further includes:
identifying any bid objects in the active register at the end of the bid session that have expired bid period objects and that are not in the bid block, wherein the removing includes removing the identified bid blocks having expired bid period objects.

13. The method of claim 11, further including:
receiving, into the staging register during the bid session of the active register, a plurality of additional bid objects for the particular item; and
moving, by the bidding engine at the beginning of the subsequent bid session, the additional bid objects into the active register, wherein the moved additional bid objects and the bid objects in the active register remaining after the removing comprise the remaining bid objects, and wherein the remaining bid objects are organized with the remaining bid object having a price object with a highest price and continuing to the remaining bid object having a price object with the lowest price.

14. The method of claim 10, wherein receiving the plurality of indications includes:
first receiving, by the bidding engine during the bid session from a first potential seller of the particular item, a first indication of a particular bid object; and
second receiving, by the bidding engine during the bid session and after the first receiving from a second potential seller of the particular item, a second indication of the particular bid object,
wherein the method further includes generating, by the bidding engine during the bid session after the second receiving, a message to the second potential seller indicating that the second indication has been rejected and requesting another indication of a different one of the bid objects.

15. The method of claim 10, wherein receiving the plurality of indications includes:
first receiving, by the bidding engine during the bid session from a first potential seller of the particular item, a first indication of a first particular bid object, wherein the price object of the first particular bid object defines a first price, and wherein first particular bid object and the bid objects above the first particular bid object up to the bid object having the price object with the highest price comprises a first particular bid block;
second receiving, by the bidding engine during the bid session and after the first receiving from a second potential seller of the particular item, a second indication of a second particular bid object, wherein the price object of the second particular bid object defines a second price less than the first price, and wherein second particular bid object and the bid objects above the second particular bid object up to the bid object having the price object with the highest price comprises a second particular bid block; and
automatically adjusting, by the bidding engine during the bid session and after the second receiving, the first particular bid block to be defined by a third particular bid object having a price object defining a third price less than the second price and including bid objects above the third particular bid object up to the bid object having the price object with the highest price.

16. The method of claim 15, further including:
accessing, by the bidding engine, a preference object associated with the first potential seller, wherein the preference object includes a rule defining how the first particular bid block is to be adjusted in the event of a subsequent bid block being created during the bid session and having a particular bid object with a price object defining a price below the first price, and wherein the automatically adjusting step is based on the accessing step.

17. The method of claim 1, wherein enabling the optimum price that the buyers are willing to pay for the particular item to be determined by the seller includes:
causing prices of each bid object, and a number of bid objects above the particular bid object, in the active register to be displayed, via the seller user interface, to the seller for review; and
receiving, using the bidding engine and via the seller user, a signal representative of a selection by the seller of the particular bid object.

18. A computerized bidding system for facilitating the bulk sale of an item from a seller to a plurality of buyers in an electronic marketplace utilizing an Internet platform, the system comprising:
at least one processor;
at least one memory storage device operably coupled to the one or more processors; and
means for connecting, via the Internet, a seller device and buyer devices to the at least one processor, wherein the seller device and the buyer devices are positioned remotely from the at least one processor,
wherein the at least one processor is programmed, or otherwise configured, to:
cause a seller user interface to be displayed to the seller on a display device associated with the seller device;
receive, via the seller user interface, a signal representative of a subscription by the seller to one or more items available for purchase by the buyers;
cause a buyer user interface having a list of the one or more items being offered for sale by the seller to be displayed to the buyers on respective display devices associated with the buyer devices;
receive, via the buyer user interface and into a staging register of a bidding pool of the system, a plurality of bid objects for a particular item from a respective plurality of potential buyers, wherein each bid object includes a price object defining a price at or below which one or more of the respective plurality of potential buyers is willing to pay for the particular item;
automatically organize, using a bidding engine stored in the at least one memory storage device, the bid objects in the staging register starting with the bid object having a price object with a highest price and continuing to the bid object having a price object with the lowest price, wherein the bid objects in the staging register after being organized comprise organized bid objects;
move, using the bidding engine at the beginning of a bid session, the organized bid objects into an active register of the bidding pool;
provide real-time access to the seller to demand/price ratio information from the buyers, wherein to provide the real time access to the seller, the at least one processor is further programmed, or otherwise configured, to, at least:
receive, using the bidding engine via the seller user interface during the bid session, an indication of a particular one of the bid objects in the active register from a potential seller of the particular item, wherein the particular one of the bid objects and the bid objects above the particular bid object up to the bid object having the price object with the highest price comprises a bid block; and
enable an optimum price that the buyers are willing to pay for the particular item to be determined by the seller; and
generate, using the bidding engine at a conclusion of the bid session, an indication of the bid block.

19. The computerized bidding system of claim 18, the system further facilitating the bulk sale of an item from a plurality of sellers to the plurality of buyers in the electronic marketplace utilizing the Internet platform, wherein the means for connecting is configured to connect the at least one processor to a plurality of seller devices, and wherein:
to cause the seller user interface to be displayed, the at least one processor is further programmed, or otherwise configured, to cause the seller user interface to be displayed on respective display devices associated with the plurality of seller devices; and
to receive the signal representative of the subscription, the at least one processor is further programmed, or otherwise configured, to receive signals representative of subscriptions by the plurality of sellers to the one or more items available for purchase by the buyers.

20. The computerized bidding system of claim 18, wherein to enable the optimum price that the buyers are willing to pay for the particular item to be determined by the seller, the at least one processor is further configured programmed, or otherwise configured, to:
cause prices of each bid object, and a number of bid objects above the particular bid object, in the active register to be displayed, via the seller user interface, to the seller for review; and
receive, using the bidding engine and via the seller user, a signal representative of a selection by the seller of the particular bid object.

21. One or more non-transitory computer readable media having program instructions stored thereon which, when executed to facilitate the bulk sale of an item from a seller to a plurality of buyers in an electronic marketplace utilizing an Internet platform by at least one processor of one or more machines in communication, via the Internet, with a seller device and to buyer devices positioned remotely from the at least one processor, the program instructions cause the one or more machines to:
cause a seller user interface to be displayed to the seller on a display device associated with the seller device;
receive, via the seller user interface, a signal representative of a subscription by the seller to one or more items available for purchase by the buyers;
cause a buyer user interface having a list of the one or more items being offered for sale by the seller to be displayed to the buyers on respective display devices associated with the buyer devices;
receive, via the buyer user interface and into a staging register of a bidding pool of the system, a plurality of bid objects for a particular item from a respective plurality of potential buyers, wherein each bid object includes a price object defining a price at or below which one or more of the respective plurality of potential buyers is willing to pay for the particular item;

automatically organize, using a bidding engine stored in the at least one memory storage device, the bid objects in the staging register starting with the bid object having a price object with a highest price and continuing to the bid object having a price object with the lowest price, wherein the bid objects in the staging register after being organized comprise organized bid objects;

move, using the bidding engine at the beginning of a bid session, the organized bid objects into an active register of the bidding pool;

provide real-time access to the seller to demand/price ratio information from the buyers, wherein when executed by the at least one processor to provide the real time access to the seller, the program instructions cause the one or more machines to at least:

receive, using the bidding engine via the seller user interface during the bid session, an indication of a particular one of the bid objects in the active register from a potential seller of the particular item, wherein the particular one of the bid objects and the bid objects above the particular bid object up to the bid object having the price object with the highest price comprises a bid block; and enable an optimum price that the buyers are willing to pay for the particular item to be determined by the seller; and generate, using the bidding engine at a conclusion of the bid session, an indication of the bid block.

22. The one or more non-transitory computer readable media of claim 21, the program instructions further executed to facilitate the bulk sale of an item from a plurality of sellers to the plurality of buyers in the electronic marketplace utilizing the Internet platform, wherein the at least one processor is further in communication with a plurality of seller devices, and wherein:

when executed by the at least one processor to cause the seller user interface to be displayed, the program instructions further cause the one or more machines to cause the seller user interface to be displayed on respective display devices associated with the plurality of seller devices; and when executed by the at least one processor to receive the signal representative of the subscription, the program instructions further cause the one or more machines to receive signals representative of subscriptions by the plurality of sellers to the one or more items available for purchase by the buyers.

23. The one or more non-transitory computer readable media of claim 21, wherein when executed by the at least one processor to enable the optimum price that the buyers are willing to pay for the particular item to be determined by the seller, the program instructions further cause the one or more machines to:

cause prices of each bid object, and a number of bid objects above the particular bid object, in the active register to be displayed, via the seller user interface, to the seller for review; and receive, using the bidding engine and via the seller user, a signal representative of a selection by the seller of the particular bid object.

* * * * *